United States Patent
Wilkening et al.

(10) Patent No.: US 9,419,274 B2
(45) Date of Patent: Aug. 16, 2016

(54) ELECTROCHEMICAL CELLS COMPRISING POROUS STRUCTURES COMPRISING SULFUR

(71) Applicant: Sion Power Corporation, Tucson, AZ (US)

(72) Inventors: William F. Wilkening, Tucson, AZ (US); Christopher T. S. Campbell, Tucson, AZ (US); Savannah V. Burnside-Joubert, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 14/528,730

(22) Filed: Oct. 30, 2014

(65) Prior Publication Data

US 2015/0155550 A1 Jun. 4, 2015

Related U.S. Application Data

(63) Continuation of application No. 12/862,576, filed on Aug. 24, 2010, now Pat. No. 9,005,809.

(60) Provisional application No. 61/237,903, filed on Aug. 28, 2009.

(51) Int. Cl.
  *H01M 4/36* (2006.01)
  *H01M 4/136* (2010.01)
  (Continued)

(52) U.S. Cl.
  CPC ............... *H01M 4/364* (2013.01); *H01G 11/06* (2013.01); *H01M 4/0402* (2013.01);
  (Continued)

(58) Field of Classification Search
  CPC ....... H01M 4/80; H01M 4/663; H01M 4/664; H01M 4/136; H01M 4/583
  See application file for complete search history.

(56) References Cited

U.S. PATENT DOCUMENTS 3,716,409 A 2/1973 Cairns et al.
3,833,421 A 9/1974 Rubischko et al.
(Continued)

FOREIGN PATENT DOCUMENTS

CN 1534811 A 10/2004
CN 1574427 A 2/2005
(Continued)

OTHER PUBLICATIONS

International Search Report and Written Opinion for PCT/US2009/000090 mailed Jul. 31, 2009.
(Continued)

*Primary Examiner* — Jane Rhee
(74) *Attorney, Agent, or Firm* — Wolf, Greenfield & Sacks, P.C.

(57) ABSTRACT

The present invention relates to the use of porous structures comprising sulfur in electrochemical cells. Such materials may be useful, for example, in forming one or more electrodes in an electrochemical cell. For example, the systems and methods described herein may comprise the use of an electrode comprising a conductive porous support structure and a plurality of particles comprising sulfur (e.g., as an active species) substantially contained within the pores of the support structure. The inventors have unexpectedly discovered that, in some embodiments, the sizes of the pores within the porous support structure and/or the sizes of the particles within the pores can be tailored such that the contact between the electrolyte and the sulfur is enhanced, while the electrical conductivity and structural integrity of the electrode are maintained at sufficiently high levels to allow for effective operation of the cell. Also, the sizes of the pores within the porous support structures and/or the sizes of the particles within the pores can be selected such that any suitable ratio of sulfur to support material can be achieved while maintaining mechanical stability in the electrode. The inventors have also unexpectedly discovered that the use of porous support structures comprising certain materials (e.g., metals such as nickel) can lead to relatively large increases in cell performance. In some embodiments, methods for forming sulfur particles within pores of a porous support structure allow for a desired relationship between the particle size and pore size. The sizes of the pores within the porous support structure and/or the sizes of the particles within the pores can also be tailored such that the resulting electrode is able to withstand the application of an anisotropic force, while maintaining the structural integrity of the electrode.

17 Claims, 15 Drawing Sheets

(51) Int. Cl.
    *H01M 4/58*     (2010.01)
    *H01M 4/66*     (2006.01)
    *H01M 4/80*     (2006.01)
    *H01M 4/64*     (2006.01)
    *H01M 4/38*     (2006.01)
    *H01G 11/06*    (2013.01)
    *H01M 4/04*     (2006.01)
    *H01M 4/583*    (2010.01)
    *H01M 4/60*     (2006.01)
    *H01M 4/02*     (2006.01)
    *H01M 10/42*    (2006.01)

(52) U.S. Cl.
    CPC .............. *H01M 4/136* (2013.01); *H01M 4/38*
        (2013.01); *H01M 4/583* (2013.01); *H01M*
        *4/5815* (2013.01); *H01M 4/60* (2013.01);
        *H01M 4/602* (2013.01); *H01M 4/64* (2013.01);
        *H01M 4/668* (2013.01); *H01M 4/80* (2013.01);
        *H01M 2004/021* (2013.01); *H01M 2010/4292*
        (2013.01); *Y02E 60/122* (2013.01); *Y02E 60/13*
        (2013.01); *Y02P 70/54* (2015.11); *Y02T*
        *10/7022* (2013.01); *Y10T 29/49108* (2015.01);
        *Y10T 29/49115* (2015.01)

(56) References Cited

U.S. PATENT DOCUMENTS

| | | |
|---|---|---|
| 3,859,139 A | 1/1975 | Dews et al. |
| 3,907,579 A | 9/1975 | Ravault |
| 3,951,689 A | 4/1976 | Ludwig |
| 4,011,374 A | 3/1977 | Kaun |
| 4,169,120 A | 9/1979 | Miller |
| 4,184,013 A | 1/1980 | Weddigen et al. |
| 4,235,528 A | 11/1980 | Yano et al. |
| 4,337,140 A | 6/1982 | Solomon |
| 4,339,325 A | 7/1982 | Solomon et al. |
| 4,384,029 A | 5/1983 | Kordesch et al. |
| 4,410,609 A | 10/1983 | Peled et al. |
| 4,556,618 A | 12/1985 | Shia |
| 4,624,902 A | 11/1986 | DeNeufville et al. |
| 4,664,991 A | 5/1987 | Perichaud et al. |
| 4,677,415 A | 6/1987 | Howng |
| 4,683,178 A | 7/1987 | Stadnick et al. |
| 4,720,400 A | 1/1988 | Manniso |
| 4,739,018 A | 4/1988 | Armand et al. |
| 4,770,956 A | 9/1988 | Knoedler |
| 4,833,048 A | 5/1989 | Dejonghe et al. |
| 4,917,974 A | 4/1990 | De Jonghe et al. |
| H858 H | 12/1990 | Leonard et al. |
| 5,126,082 A | 6/1992 | Frank |
| 5,162,175 A | 11/1992 | Visco et al. |
| 5,194,341 A | 3/1993 | Bagley et al. |
| 5,290,414 A | 3/1994 | Marple |
| 5,324,599 A | 6/1994 | Oyama et al. |
| 5,328,946 A | 7/1994 | Tuminello et al. |
| 5,433,917 A | 7/1995 | Srivastava et al. |
| 5,441,831 A | 8/1995 | Okamoto et al. |
| 5,462,566 A | 10/1995 | Skotheim |
| 5,516,598 A | 5/1996 | Visco et al. |
| 5,529,860 A | 6/1996 | Skotheim et al. |
| 5,538,812 A | 7/1996 | Lee et al. |
| 5,582,623 A | 12/1996 | Chu |
| 5,601,947 A | 2/1997 | Skotheim et al. |
| 5,648,187 A | 7/1997 | Skotheim |
| 5,686,201 A | 11/1997 | Chu |
| 5,690,702 A | 11/1997 | Skotheim et al. |
| 5,698,339 A | 12/1997 | Kawakami et al. |
| 5,723,230 A | 3/1998 | Naoi et al. |
| 5,783,330 A | 7/1998 | Naoi et al. |
| 5,792,575 A | 8/1998 | Naoi et al. |
| 5,814,420 A | 9/1998 | Chu |
| 5,861,222 A | 1/1999 | Fischer et al. |
| 5,882,812 A | 3/1999 | Visco et al. |
| 5,882,819 A | 3/1999 | Naoi et al. |
| 5,895,732 A | 4/1999 | Clough |
| 5,919,587 A | 7/1999 | Mukherjee et al. |
| 5,961,672 A | 10/1999 | Skotheim et al. |
| 5,989,467 A | 11/1999 | Daws et al. |
| 6,030,720 A | 2/2000 | Chu et al. |
| 6,110,417 A | 8/2000 | Sugikawa |
| 6,110,621 A | 8/2000 | Sandi et al. |
| 6,117,590 A | 9/2000 | Skotheim et al. |
| 6,143,216 A | 11/2000 | Loch et al. |
| 6,153,337 A | 11/2000 | Carlson et al. |
| 6,168,694 B1 | 1/2001 | Huang et al. |
| 6,168,886 B1 | 1/2001 | Clough |
| 6,194,099 B1 | 2/2001 | Gernov et al. |
| 6,201,100 B1 | 3/2001 | Gorkovenko et al. |
| 6,306,545 B1 | 10/2001 | Carlson et al. |
| 6,312,853 B1 | 11/2001 | Zhang et al. |
| 6,358,643 B1 | 3/2002 | Katz et al. |
| 6,403,261 B2 | 6/2002 | Mitkin et al. |
| 6,528,211 B1 | 3/2003 | Nishimura et al. |
| 6,544,688 B1 | 4/2003 | Cheng |
| 6,558,847 B1 | 5/2003 | Kawakami et al. |
| 6,680,013 B1 | 1/2004 | Stein et al. |
| 6,753,036 B2 | 6/2004 | Jankowski et al. |
| 6,913,998 B2 | 7/2005 | Jankowski et al. |
| 7,019,494 B2 | 3/2006 | Mikhaylik |
| 7,029,796 B2 | 4/2006 | Choi et al. |
| 7,157,185 B2 | 1/2007 | Marple |
| 7,247,408 B2 | 7/2007 | Skotheim et al. |
| 7,250,233 B2 | 7/2007 | Choi et al. |
| 7,361,431 B2 | 4/2008 | Kim et al. |
| 7,553,584 B2 | 6/2009 | Chiang et al. |
| 7,579,112 B2 | 8/2009 | Chiang et al. |
| 7,695,861 B2 | 4/2010 | Kolosnitsyn et al. |
| 7,771,870 B2 | 8/2010 | Affinito et al. |
| 8,087,309 B2 | 1/2012 | Kelley et al. |
| 8,137,525 B1 | 3/2012 | Harreld et al. |
| 9,005,809 B2 | 4/2015 | Wilkening et al. |
| 9,034,421 B2 | 5/2015 | Mikhaylik et al. |
| 2001/0024749 A1 | 9/2001 | Michot et al. |
| 2001/0034934 A1 | 11/2001 | Xu et al. |
| 2001/0041283 A1 | 11/2001 | Hitomi |
| 2002/0009626 A1 | 1/2002 | Terazono et al. |
| 2002/0018933 A1 | 2/2002 | Mitkin et al. |
| 2002/0106561 A1 | 8/2002 | Lee et al. |
| 2002/0192557 A1 | 12/2002 | Choi et al. |
| 2003/0073000 A1 | 4/2003 | Lee et al. |
| 2003/0082446 A1 | 5/2003 | Chiang et al. |
| 2003/0091900 A1* | 5/2003 | Numata ............ C01G 45/1242 429/224 |
| 2003/0099884 A1 | 5/2003 | Chiang et al. |
| 2003/0108785 A1 | 6/2003 | Wu et al. |
| 2003/0113622 A1 | 6/2003 | Blasi et al. |
| 2003/0113624 A1 | 6/2003 | Kim et al. |
| 2003/0124416 A1 | 7/2003 | Kaneta |
| 2003/0124427 A1 | 7/2003 | Takeuchi et al. |
| 2003/0129500 A1 | 7/2003 | Gan et al. |
| 2003/0180611 A1 | 9/2003 | Mikhaylik et al. |
| 2003/0215714 A1 | 11/2003 | Barker et al. |
| 2003/0222048 A1 | 12/2003 | Asakawa et al. |
| 2003/0228518 A1 | 12/2003 | Marple |
| 2004/0037771 A1 | 2/2004 | Meissner et al. |
| 2004/0047798 A1 | 3/2004 | Oh et al. |
| 2004/0058246 A1 | 3/2004 | Choi et al. |
| 2004/0118698 A1 | 6/2004 | Lu et al. |
| 2004/0191607 A1 | 9/2004 | Nobuta et al. |
| 2004/0202936 A1 | 10/2004 | Mikhaylik |
| 2004/0234851 A1 | 11/2004 | Kim et al. |
| 2004/0265672 A1 | 12/2004 | Wei |
| 2005/0008938 A1 | 1/2005 | Cho et al. |
| 2005/0048371 A1 | 3/2005 | Nagayama et al. |
| 2005/0147886 A1 | 7/2005 | Mikhaylik |
| 2005/0156575 A1 | 7/2005 | Mikhaylik |
| 2005/0158535 A1 | 7/2005 | Zhang et al. |
| 2005/0175904 A1 | 8/2005 | Gorkovenko |
| 2005/0181269 A1 | 8/2005 | Eshraghi et al. |
| 2005/0234177 A1 | 10/2005 | Zaghib et al. |
| 2005/0266990 A1 | 12/2005 | Iwasaki et al. |
| 2006/0024579 A1 | 2/2006 | Kolosnitsyn et al. |

(56) References Cited

U.S. PATENT DOCUMENTS

| | | |
|---|---|---|
| 2006/0046926 A1 | 3/2006 | Ji et al. |
| 2006/0115579 A1 | 6/2006 | Mukherjee et al. |
| 2006/0193889 A1 | 8/2006 | Spradlin et al. |
| 2006/0194096 A1 | 8/2006 | Valle et al. |
| 2006/0234117 A1 | 10/2006 | Fujikawa et al. |
| 2006/0238203 A1 | 10/2006 | Kelley et al. |
| 2007/0065701 A1 | 3/2007 | Cable et al. |
| 2007/0065724 A1 | 3/2007 | Barker et al. |
| 2007/0207370 A1 | 9/2007 | Kwak et al. |
| 2007/0221265 A1 | 9/2007 | Affinito et al. |
| 2007/0224502 A1 | 9/2007 | Affinito et al. |
| 2008/0100264 A1 | 5/2008 | Kolosnitsyn et al. |
| 2008/0187663 A1 | 8/2008 | Affinito |
| 2008/0246580 A1 | 10/2008 | Braun et al. |
| 2008/0318128 A1 | 12/2008 | Simoneau et al. |
| 2009/0053607 A1 | 2/2009 | Jeong et al. |
| 2009/0098457 A1 | 4/2009 | Kwon et al. |
| 2009/0159853 A1 | 6/2009 | Sengupta et al. |
| 2009/0200986 A1 | 8/2009 | Kopera et al. |
| 2009/0311604 A1 | 12/2009 | Nazar et al. |
| 2010/0035128 A1 | 2/2010 | Scordilis-Kelley et al. |
| 2010/0068623 A1 | 3/2010 | Braun et al. |
| 2010/0129699 A1 | 5/2010 | Mikhaylik et al. |
| 2010/0239914 A1 | 9/2010 | Mikhaylik et al. |
| 2011/0008531 A1 | 1/2011 | Mikhaylik et al. |
| 2011/0045346 A1 | 2/2011 | Chiang et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0129723 A1 | 6/2011 | Tsuchida |
| 2011/0165466 A1 | 7/2011 | Zhamu et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0028128 A1 | 2/2012 | Seino et al. |
| 2012/0048729 A1 | 3/2012 | Mikhaylik et al. |
| 2012/0070746 A1 | 3/2012 | Mikhaylik et al. |
| 2013/0224601 A1 | 8/2013 | Burnside et al. |
| 2013/0252103 A1 | 9/2013 | Mikhaylik et al. |
| 2013/0316072 A1 | 11/2013 | Scordilis-Kelley et al. |

FOREIGN PATENT DOCUMENTS

| | | |
|---|---|---|
| CN | 1845364 A | 10/2006 |
| CN | 1323445 C | 6/2007 |
| CN | 101026247 A | 8/2007 |
| CN | 100355123 C | 12/2007 |
| EP | 1 324 409 A2 | 7/2003 |
| GB | 1 011 353 A | 11/1965 |
| GB | 1 396 062 A | 5/1975 |
| JP | H03-257767 A | 11/1991 |
| JP | H04-359865 A | 12/1992 |
| JP | 05-325978 A | 12/1993 |
| JP | 09-147868 A | 6/1997 |
| JP | 11-176423 A | 7/1999 |
| JP | 2001-093577 A | 4/2001 |
| JP | 2001-527276 A | 12/2001 |
| JP | 2002-203542 A | 7/2002 |
| JP | 2002-367678 A | 12/2002 |
| JP | 2003-193110 A | 7/2003 |
| JP | 2003-197196 A | 7/2003 |
| JP | 2003-303588 A | 10/2003 |
| JP | 2005-251429 A | 9/2005 |
| JP | 2005-310836 A | 11/2005 |
| JP | 2006-143478 A | 6/2006 |
| JP | 2007-518230 A | 7/2007 |
| JP | 2007-234338 A | 9/2007 |
| JP | 2009-076260 A | 4/2009 |
| JP | 2010-009856 A | 1/2010 |
| JP | 2011-518743 A | 6/2011 |
| KR | 10-0436712 B1 | 6/2004 |
| KR | 10-0484642 B1 | 4/2005 |
| WO | WO 99/33125 A1 | 7/1999 |
| WO | WO 99/33130 A1 | 7/1999 |
| WO | WO 99/33131 A1 | 7/1999 |
| WO | WO 2007/028972 A1 | 3/2007 |
| WO | WO 2008/153749 A1 | 12/2008 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2009/114314 A2 | 9/2009 |
| WO | WO 2010/062391 A2 | 6/2010 |
| WO | WO 2010/074690 A1 | 7/2010 |
| WO | WO 2012/027457 A2 | 3/2012 |

OTHER PUBLICATIONS

Written Opinion for PCT/US2009/000090 mailed Jan. 12, 2010.
International Preliminary Report on Patentability for PCT/US2009/000090, mailed Apr. 30, 2010.
International Search Report and Written Opinion for PCT/US2010/000819, mailed Dec. 21, 2010.
International Preliminary Report on Patentability for PCT/US2010/000819, mailed Sep. 29, 2011.
Office Communication mailed Mar. 21, 2014 in connection with CN 201080048917.9 and English translation thereof.
Chinese Office Action mailed Nov. 21, 2014 for Application No. CN2014111801290210.
Extended European Search Report for EP10815728.0, mailed Jan. 17, 2014.
Office Communication mailed Mar. 4, 2014 in connection with JP2012-526723.
Office Communication mailed Jan. 20, 2015 in connection with JP2012-526723.
International Search Report and Written Opinion for PCT/US2010/002329, mailed May 31, 2011.
International Preliminary Report on Patentability for PCT/US2010/002329, issued Feb. 28, 2012.
International Search Report and Written Opinion for PCT/US2012/026281, mailed Sep. 26, 2012.
International Preliminary Report on Patentability for PCT/US2012/026281, mailed Sep. 6, 2013.
International Search Report and Written Opinion for PCT/US2013/026054, mailed May 25, 2013.
International Search Report and Written Opinion for Application No. PCT/US2013/029905 mailed Jun. 3, 2013.
Office Communication mailed Mar. 25, 2013 for U.S. Appl. No. 12/862,581.
Office Communication mailed Jun. 27, 2012 for U.S. Appl. No. 13/046,142.
Office Communication mailed Dec. 21, 2012 for U.S. Appl. No. 13/046,142.
Office Communication mailed Jan. 3, 2014 for U.S. Appl. No. 13/889,465.
Office Communication mailed Jun. 20, 2014 for U.S. Appl. No. 13/889,465.
Office Communication mailed May 2, 2013 for U.S. Appl. No. 12/862,563.
Office Communication mailed Jan. 16, 2014 for U.S. Appl. No. 12/862,563.
Office Communication mailed Feb. 22, 2013 for U.S. Appl. No. 12/862,551.
Office Communication mailed Jan. 4, 2013 for U.S. Appl. No. 12/862,576.
Office Communication mailed Jun. 20, 2013 for U.S. Appl. No. 12/862,576.
Office Communication mailed Oct. 18, 2013 for U.S. Appl. No. 12/862,576.
Office Communication mailed Apr. 24, 2014 for U.S. Appl. No. 12/862,576.
Notice of Allowance mailed Jul. 31, 2014 for U.S. Appl. No. 12/862,576.
Notice of Allowance mailed Dec. 17, 2014 for U.S. Appl. No. 12/862,576.

(56) References Cited

OTHER PUBLICATIONS

Office Communication mailed Apr. 14, 2014 for U.S. Appl. No. 13/240,113.
Office Communication mailed Jul. 12, 2013 for U.S. Appl. No. 13/033,419.
Office Communication mailed Feb. 13, 2013 for U.S. Appl. No. 13/033,419.
Office Communication mailed Oct. 8, 2014 for U.S. Appl. No. 13/033,419.
Ahn, et al., "Electrochemical Properties of Sulfur with Various Particle Size for Lithium Sulfur Batteries" Proceedings of the Power Sources Conference (2010), 44th, 130-133 CODEN: PPOCFD.
Brunauer et al., Adsorption of Gases in Multimolecular Layers. J Am Chem Soc. 1938;60(2):309-19.
Campbell et al., Electrodeposition of Mesoporous Nickel onto Foamed Metals Using Surfactant and Polymer Templates. J Porous Mater. 2004;11(2):63-69.
Cheon et al., Capacity fading mechanisms on cycling a high-capacity secondary sulfur cathode. J Electrochem Soc. Oct. 29, 2004;151(12):A2067-73.
Cheon et al., Rechargeable lithium sulfur battery: II. Rate capability and cycle characteristics. J Electrochem Soc. May 5, 2003;150(6):A800-05.
Cunningham et al., Phase Equilibria in Lithium-Chalcogen Systems. J Electrochem Soc. 1972;119:1448-50.
Doherty et al., Colloidal Crystal Templating to Produce Hierarchically Porous LiFePO4 Electrode Materials for High Power Lithium Ion Batteries. Chem Mater. 2009;21(13):2895-2903.
Elazari et al. Morphological and structural studies of composite sulfur electrodes upon cycling by HRTEM, AFM and Raman spectroscopy. Journal of the Electrochemical Society. 2010; 157(10):A1131-A1138.
Garboczi, Permeability, diffusivity, and microstructural parameters: A critical review. Cement and Concrete Res. Jul. 1990;20(4):591-601.
Gonzenbach et al., Macroporous ceramics from particle-stabilized wet foams. J Am Ceram Soc. 2007;90(1):16-22.
Hassoun et al., A High-Performance Polymer Tin Sulfur Lithium Ion Battery. Angew. Chem. Int. Ed. 2010, 49, 2371-2374.
Hayashi et al., All-solid-state rechargeable lithium batteries with Li2S as a positive electrode material. Journal of Power Sources 183 (2008) 422-426.
He et al., Distribution of sulphur and electrochemical properties of nickel sulphur coatings electrodeposited on the nickel foam as hydrogen evolution reaction cathodes. Material Letters. Aug. 15, 2005; 59:3968-3972.
Ji et al., A highly ordered nanostructured carbon—sulphur cathode for lithium—sulphur batteries. Nature Mater. May 17, 2009;8(6):500-06.
Jun et al., Synthesis of New, Nanoporous Carbon with Hexagonally Ordered Mesostructure. JACS 2000;112(43):10712-3. doi: 10.1021/ja002261e.
Kim et al., Correlation between positive-electrode morphology and sulfur utilization in lithium—sulfur battery. J Power Sources. May 20, 2004;132(1-2):209-12.
Kulinowski et al., Porous metals from colloidal templates. Adv Mater. 2000;12(11): 833-38.
Lai et al., Synthesis and Electrochemical Performance of Sulfur/Highly Porous Carbon Composites. J. Phys. Chem. C 2009, 113, 4712-4716.
Mikhaylik et al., 380 Wh/kg Rechargeable Li/S Batteries Operating at 90% of Sulfur Utilization. 206th Meeting of the Electrochemical Society. Honolulu, Hawaii. Oct. 3-8, 2004. Abst. 443.
Mikhaylik et al., Polysulfide Shuttle Study in the Li/S Battery System. J Electrochem Soc. 2004;151:A1969-76.
Peer, Tef_methy_ethyl. Accessed online at peer.tamu.edu/curriculum_modules/properties/module_3/Tef_methyl_ethyl.htm. Last accessed May 31, 2013. 1 page.
Probst et al., Structure and electrical properties of carbon black. Carbon. Feb. 2002;40(2):201-5.

Rauh et al., A Lithium/Dissolved Sulfur Battery with an Organic Electrolyte. J Electrochem Soc. 1979;126:523-27.
Ravikrishna et al., Low-temperature synthesis of porous hydroxyapatite scaffolds using polyaphron templates. J Sol-Gel Sci Techn. Apr. 2006;38(2):203-10.
Ronci et al., A novel approach to in situ diffractometry of intercalation materials: the EDXD technique. Preliminary results on $LiNi_{0.8}Co_{0.2}O_2$. Electrochem Solid-State Lett. 2000;3(4):174-7.
Ruiz-Morales et al., Microstructural optimisation of materials for SOFC applications using PMMA microspheres. J Mater Chem. 2006;16:540-42.
Ryu et al., Discharge behavior of lithium/sulfur cell with TEGDME based electrolyte at low temperature. J Electrochem Soc. 2006;163:201-06.
Sakka et al., Fabrication of porous ceramics with controlled pore size by colloidal processing. Sci Technol Adv Mater. Nov. 2005;6(8):915-20.
Shim et al., The Lithium/Sulfur Rechargeable Cell. Effects of Electrode Composition and Solvent on Cell Performance. J Electrochem Soc. 2002;149:A1321-25.
Shin et al., Characterization of N-Methyl-N-Butylprrolidinium Bis(trifluoromethanesulfonyl)imide-LiTFSI-Tetra(ethylene gylcol) Dimethyl Ether Mixtures as a Li Metal Cell Electrolyte. J Power Sources. 2008;155:A368-73.
Takeuchi et al., Preparation of electrochemically active lithium sulfide—carbon composites using spark-plasma-sintering process. Journal of Power Sources 195 (2010) 2928-2934.
Wang et al., Electrochemical characteristics of sulfur composite cathode materials in rechargeable lithium batteries. J Power Sources. Nov. 15, 2004;138(1-2):271-73.
Wang et al., Polymer lithium cells with sulfur composites as cathode materials. Electrochimica Acta 48 (2003) 1861-1867.
Wang et al., Sulfur—carbon nano-composite as cathode for rechargeable lithium battery based on gel electrolyte. Electrochem Comm 2002;4(6):499-502.
Woo et al., Preparation and characterization of three demensionally ordered macroporous $Li_4Ti_5O_{12}$ anode for lithium batteries. Electrochimica Acta. 2007;53(1):79-82.
Yuan et al., Improvement of cycle property of sulfur-coated multi-walled carbon nanotubes composite cathode for lithium/sulfur batteries. J Power Sources. Apr. 15, 2009;189(2):1141-46.
Zhang et al., A three-dimensional tin-coated nanoporous copper for lithium-ion battery anodes. Journal of Power Sources. 2011; 196:6915-6919.
Zhang et al., Dual-scale porous electrodes for solid oxide fuel cells from polymer foams. Adv Mater. 2005;17(4):487-91.
Zhang et al., Enhancement of long stability of sulfur cathode by encapsulating sulfur into micropores of carbon spheres. Energy & Environmental Science. 2010, 3, 1531-1537.
Zhang et al., Novel Nanosized Adsorbing Composite Cathode Materials for the Next Generational Lithium Battery. Journal of Wuhan University of Technology—Mater. Sci. Ed. 2007;22(2):234-39.
Zhang et al., Three-dimensional ordered macroporous platinum-based electrode for methanol oxidation. Chinese Sci Bulletin. Jan. 2006;51(1):19-24.
Zheng et al., Electrochemical properties of rechargeable lithium batteries with sulfur-containing composite cathode materials. Electrochem Solid-State Lett., May 12, 2006; 9(7):A364-A367.
Zheng et al., Li[Ni1/3Mn1/3Co1/3]O2-based electrodes for PHEV applications: an optimization. ECS Transactions. 2008;11(32): 1-9.
Zheng et al., Novel nanosized adsorbing sulfur composite cathode materials for the advanced secondary lithium batteries. Electrochimica Acta. Jan. 5, 2006;51(7):1330-35.
U.S. Appl. No. 12/811,576, filed Sep. 23, 2010, Mikhaylik et al.
U.S. Appl. No. 12/862,528, filed Aug. 24, 2010, Affinito et al.
U.S. Appl. No. 12/862,576, filed Aug. 24, 2010, Wilkening et al.
U.S. Appl. No. 13/240,113, filed Sep. 22, 2011, Mikhaylik et al.
U.S. Appl. No. 13/033,419, filed Feb. 23, 2011, Campbell et al.
PCT/US2009/000090, Jul. 31, 2009, International Search Report and Written Opinon.
PCT/US2009/000090, Jan. 12, 2010, Written Opinion.
PCT/US2009/000090, Apr. 30, 2010, International Preliminary Report on Patentability.

(56) References Cited

OTHER PUBLICATIONS

PCT/US2010/000819, Dec. 21, 2010, International Search Report and Written Opinion.
PCT/US2010/000819, Sep. 29, 2011, International Preliminary Report on Patentability.
CN 201080048917.9, Apr. 17, 2014, Office Communication.
CN2014111801290210, Nov. 21, 2014, Office Communication.
EP10815728.0, Jan. 17, 2014, Extended European Search Report.
JP2012-526723, Mar. 4, 2014, Office Communication.
JP2012-526723, Jan. 20, 2015, Office Communication.
PCT/US2010/002329, May 31, 2011, International Search Report and Written Opinion.
PCT/US2010/002329, Feb. 28, 2012, International Preliminary Report on Patentability.
PCT/US2012/026281, Sep. 26, 2012, International Search Report and Written Opinion.
PCT/US2012/026281, Sep. 6, 2013, International Preliminary Report on Patentability.
PCT/US2013/026054, May 25, 2013, International Search Report and Written Opinion.
PCT/US2013/029905, Jun. 3, 2013, International Search Report and Written Opinion.
Office Action mailed Oct. 27, 2015 in connection with JP 2012-526723.
Office Action mailed Jun. 1, 2015 in connection with CN 201080048917.9.
Chen et al., Recent advances in lithium—sulfur batteries. Journal of Power Sources. 2014;267:770-83. Epub Jun. 19, 2014.
Office Communication mailed Jun. 17, 2016 for U.S. Appl. No. 13/033,419.

\* cited by examiner

ELECTROCHEMICAL CELLS COMPRISING POROUS STRUCTURES COMPRISING SULFUR

RELATED APPLICATIONS

This application is a continuation of U.S. patent application Ser. No. 12/862,576, filed Aug. 24, 2010, and entitled "Electrochemical Cells Comprising Porous Structures Comprising Sulfur," which claims priority under 35 U.S.C. §119(e) to U.S. Provisional Patent Application No. 61/237,903, filed Aug. 28, 2009, and entitled "Electrochemical Cells Comprising Porous Structures Comprising Sulfur," each of which is incorporated herein by reference in its entirety for all purposes.

FIELD OF INVENTION

The present invention relates to electrochemical cells, and more specifically, to systems and methods involving electrochemical cells comprising porous structures comprising sulfur.

BACKGROUND

A typical electrochemical cell includes a cathode and an anode which participate in an electrochemical reaction. Generally, electrochemical reactions are facilitated by an electrolyte, which can contain free ions and can behave as an electrically conductive medium. The performance of an electrochemical cell can be enhanced by increasing the amount of contact between an electrode active material and the electrolyte (e.g., by employing porous electrodes), which can lead to an increase in the rate of the electrochemical reaction within the cell. In addition, the performance of an electrochemical cell can be enhanced by maintaining a high degree of electrical conductivity within the bulk of the electrodes (e.g., between an electrode active material and a support on which it is deposited). Accordingly, systems and methods that increase the amount of contact between electrode active materials and electrolytes as well as increase the electrical conductivity within the electrodes would be beneficial.

SUMMARY OF THE INVENTION

The present invention relates to electrochemical cells, and more specifically, to systems and methods involving electrochemical cells comprising porous structures comprising sulfur. The subject matter of the present invention involves, in some cases, interrelated products, alternative solutions to a particular problem, and/or a plurality of different uses of one or more systems and/or articles.

In one aspect, an electrode for use in an electrochemical cell comprises a porous support structure comprising a plurality of pores; and an electrode active material comprising sulfur substantially contained within the pores of the porous support structure, wherein: each pore of the plurality of pores has a pore volume, and the plurality of pores has a total pore volume defined by the sum of each of the individual pore volumes; at least about 50% of the total pore volume is occupied by pores having cross-sectional diameters of between about 0.1 microns and about 10 microns, and the electrode comprises at least about 20 wt % sulfur.

In another aspect, an electrode for use in an electrochemical cell comprises a porous support structure comprising a plurality of pores; and an electrode active material comprising sulfur substantially contained within the pores of the porous support structure, wherein: the plurality of pores of the porous support structure together defines a total pore volume, and at least about 50% of the total pore volume is defined by pores having cross-sectional diameters of between about 0.1 microns and about 10 microns; and the electrode comprises at least about 20 wt % sulfur.

In one aspect, a method of making an electrode for use in an electrochemical cell comprises providing a porous support structure comprising a plurality of pores, wherein the plurality of pores of the porous support structure together define a total pore volume, and at least about 50% of the total pore volume is defined by pores having cross-sectional diameters of between about 0.1 microns and about 10 microns; and depositing an electrode active material comprising sulfur within the pores of the polymeric porous support structure, wherein the electrode comprises at least about 20 wt % sulfur.

In one aspect, a method of making an electrode for use in an electrochemical cell is provided. In some embodiments, the method comprises providing a polymeric porous support structure comprising a plurality of pores, wherein the plurality of pores of the polymeric porous support structure together define a total pore volume, and at least about 50% of the total pore volume is defined by pores having cross-sectional diameters of between about 0.1 microns and about 10 microns; and depositing an electrode active material comprising sulfur within the pores of the polymeric porous support structure.

In another aspect, an electrode is provided. The electrode can comprise, in some embodiments, a polymeric porous support structure comprising a plurality of pores; and a plurality of particles comprising an electrode active material comprising sulfur substantially contained within the pores of the polymeric porous support structure, wherein each particle of the plurality of particles has a maximum cross-sectional dimension; each particle of the plurality of particles has a particle volume, and the plurality of particles has a total particle volume defined by the total of each of the individual particle volumes; and at least about 50% of the total particle volume is occupied by particles having maximum cross-sectional dimensions of between about 0.1 microns and about 10 microns.

The electrode can comprise, in some instances, a polymeric porous support structure comprising a plurality of pores; and a plurality of particles comprising an electrode active material comprising sulfur substantially contained within the pores of the polymeric porous support structure, wherein the plurality of particles together defines a total quantity of particulate material, and wherein at least about 50% of the total quantity of particulate material is made up of particles having maximum cross-sectional dimensions of between about 0.1 microns and about 10 microns.

In some cases, the electrode can comprise a polymeric porous support structure comprising a plurality of pores; and an electrode active material comprising sulfur substantially contained within the pores of the polymeric porous support structure, wherein each pore of the plurality of pores has a pore volume, and the plurality of pores has a total pore volume defined by the total of each of the individual pore volumes; and at least about 50% of the total pore volume is occupied by pores having cross-sectional diameters of between about 0.1 microns and about 10 microns.

The electrode can comprise, in some cases, a polymeric porous support structure comprising a plurality of pores; and an electrode active material comprising sulfur substantially contained within the pores of the polymeric porous support structure, wherein the plurality of pores of the polymeric porous support structure together define a total pore volume, and at least about 50% of the total pore volume is defined by pores having cross-sectional diameters of between about 0.1 microns and about 10 microns.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control. All patents and patent applications disclosed herein are incorporated by reference in their entirety for all purposes.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
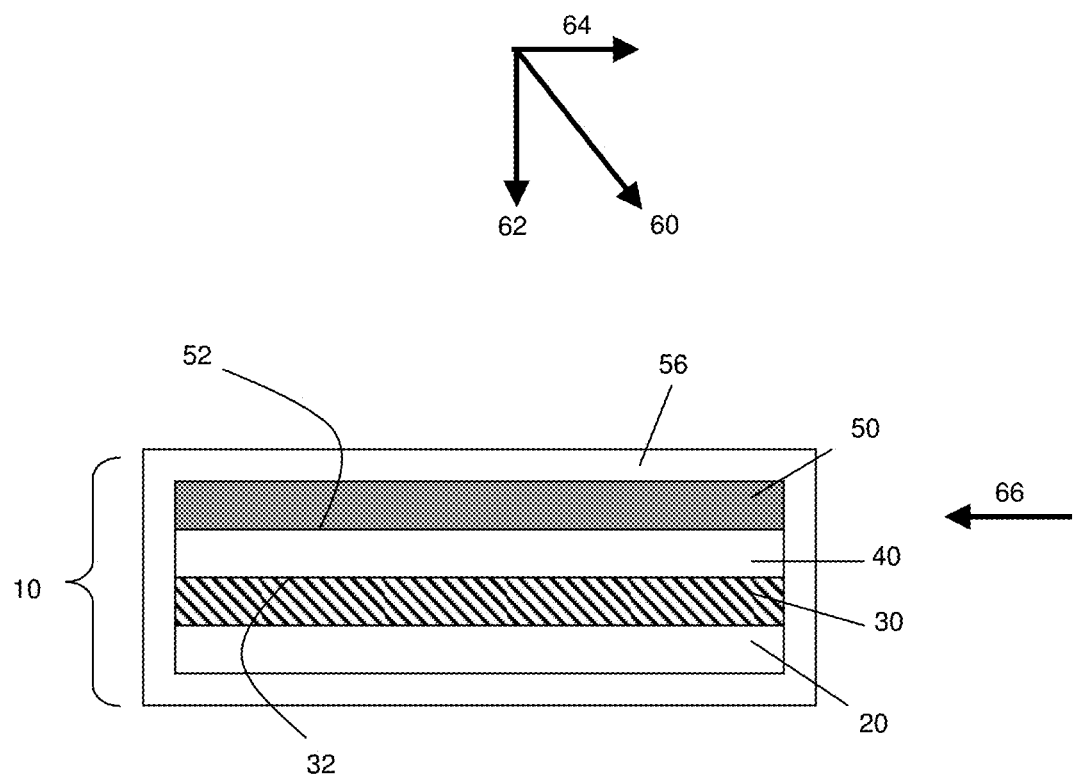
FIG. 1 is a schematic illustration of an exemplary electrochemical cell.

The present invention relates to the use of porous structures comprising sulfur in electrochemical cells. Such materials may be useful, for example, in forming one or more electrodes in an electrochemical cell. For example, the systems and methods described herein may comprise the use of an electrode comprising a conductive porous support structure and a plurality of particles comprising sulfur (e.g., as an active species) substantially contained within the pores of the support structure. The inventors have unexpectedly discovered that, in some embodiments, the sizes of the pores within the porous support structure and/or the sizes of the particles within the pores can be tailored such that the contact between the electrolyte and the sulfur is enhanced, while the electrical conductivity and structural integrity of the electrode are maintained at sufficiently high levels to allow for effective operation of the cell. Also, the sizes of the pores within the porous support structures and/or the sizes of the particles within the pores can be selected such that any suitable ratio of sulfur to support material can be achieved while maintaining mechanical stability in the electrode. The inventors have also unexpectedly discovered that the use of porous support structures comprising certain materials (e.g., metals such as nickel) can lead to relatively large increases in cell performance. In some embodiments, methods for forming particles comprising electrode active material (e.g., comprising sulfur) within pores of a porous support structure allow for a desired relationship between the particle size and pore size. The sizes of the pores within the porous support structure and/or the sizes of the particles within the pores can also be tailored such that the resulting electrode is able to withstand the application of an anisotropic force, while maintaining the structural integrity of the electrode.

In developing the systems and methods described herein, the inventors have identified several challenges associated with producing electrodes comprising sulfur. First, sulfur possesses a relatively low electrical conductivity (e.g., about $5.0 \times 10^{-14}$ S cm$^{-1}$ for elemental sulfur), which can inhibit the electrical conductivity of the electrode and hence, cell performance. In addition, small particle sulfur, which can be useful in producing uniform thickness and high surface-area electrodes, can be difficult to produce using traditional mechanical milling, as the particles that are produced can quickly re-agglomerate. Moreover, high surface area carbon, which can yield relatively high specific capacity and cycle life, can be difficult to process as a traditional slurry because it possesses a high absorption stiffness resulting in a slurry with a relatively low amount of solids. Finally, traditional slurry processing of sulfur-containing electrode materials can lead to re-distribution of the slurry components, which can produce uneven porosity within the cathode and decreased anode utilization. The inventors have unexpectedly discovered that these traditional disadvantages can be overcome by disposing particles comprising sulfur within the pores of a support material to produce an electrode that includes relatively uniform porosity, particle size, and component distribution.

The porous structures described herein can be used in electrochemical cells for a wide variety of devices, such as, for example, electric vehicles, load-leveling devices (e.g., for solar- or wind-based energy platforms), portable electronic devices, and the like. In some cases, the porous structures described herein may be particularly useful as electrodes in secondary batteries (i.e., rechargeable batteries) such as lithium-sulfur (L-S) batteries.

In one aspect, an electrode for use in an electrochemical cell is described. The electrode may comprise a porous support structure comprising a plurality of pores. As used herein, a "pore" refers to a pore as measured using ASTM Standard Test D4284-07, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g. closed cells) are not considered pores within the context of the invention. It should be understood that, in cases where the article comprises an agglomeration of particles, pores include both the interparticle pores (i.e., those pores defined between particles when they are packed together, e.g. interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

The porous support structure can comprise any suitable form. In some instances, the porous support structure can comprise a porous agglomeration of discreet particles, within which the particles can be porous or non-porous. For example, the porous support structure might be formed by mixing porous or non-porous particles with a binder to form a porous agglomeration. Electrode active material might be positioned within the interstices between the particles and/or the pores within the particles (in cases where porous particles are employed) to form the inventive electrodes described herein.

In some embodiments, the porous support structure can be a "porous continuous" structure. A porous continuous structure, as used herein, refers to a continuous solid structure that contains pores within it, with relatively continuous surfaces between regions of the solid that define the pores. Examples of porous continuous structures include, for example, a piece of material that includes pores within its volume (e.g., a porous carbon particle, a metal foam, etc.). One of ordinary skill in the art will be capable of differentiating between a porous continuous structure and, for example, a structure which is not a porous continuous structure but which is a porous agglomeration of discreet particles (where the interstices and/or other voids between the discrete particles would be considered pores) by, for example, comparing SEM images of the two structures.

The porous support structure may be of any suitable shape or size. For example, the support structure can be a porous continuous particle with any suitable maximum cross-sectional dimension (e.g., less than about 10 mm, less than about 1 mm, less than about 500 microns, etc.). In some cases, the porous support structure (porous continuous or otherwise) can have a relatively large maximum cross-sectional dimension (e.g., at least about 500 microns, at least about 1 mm, at least about 10 mm, at least about 10 cm, between about 1 mm and about 50 cm, between about 10 mm and about 50 cm, or between about 10 mm and about 10 cm). In some embodiments, the maximum cross-sectional dimension of a porous support structure within an electrode can be at least about 50%, at least about 75%, at least about 90%, at least about 95%, at least about 98%, or at least about 99% of the maximum cross sectional dimension of the electrode formed using the porous continuous structure.

In some embodiments, the support structure can be an article with one relatively thin dimension relative to the other two, such as, for example, a film. For example, the support structure can be an article with a thickness of less than about 1 mm, less than about 500 microns, less than about 100 microns, between about 1 micron and about 5 mm, between about 1 micron and about 1 mm, between about 10 microns and about 5 mm, or between about 10 microns and about 1 mm, and a width and/or length at least about 100, at least about 1000, or at least about 10,000 times greater. As used herein, the "maximum cross-sectional dimension" of an article (e.g., a porous support structure) refers to the largest distance between two opposed boundaries of an article that may be measured. Porous support structures described herein may also be of any suitable shape. For example, the support structure can be spherical, cylindrical, or prismatic (e.g., a triangular prism, rectangular prism, etc.). In some cases, the morphology of the support structure may be selected such that the support structure can be relatively easily integrated into an electrode for use in, for example, an electrochemical cell. For example, the support structure may comprise a thin film upon which additional components of an electrochemical cell (e.g., an electrolyte, another electrode, etc.) can be formed.

In some cases, porous particles can be used as a porous continuous structure. In some such embodiments, material (e.g., electrode active material) can be deposited within the pores of the particles, and the particles can be used to form an electrode. For example, porous particles containing electrode active material within their pores might be bound together (e.g., using binder or other additives) to form a composite electrode. Exemplary processes for forming such composite electrodes are described, for example, in U.S. Pub. No.: 2006/0115579, filed Jan. 13, 2006, entitled "Novel composite cathodes, electrochemical cells comprising novel composite cathodes, and processes for fabricating same", which is incorporated herein by reference in its entirety.

In some embodiments, the porous support structure might comprise a relatively large-scale porous continuous structure that, unlike the porous particles described above, is sized and shaped to serve as an electrode. Such structures can be formed of a variety of materials such as, for example, metals (e.g., a metal foam), ceramics, and polymers. Examples of such materials are described in more detail below. In some embodiments, the maximum cross-sectional dimension of a porous continuous structure within an electrode can be at least about 50%, at least about 75%, at least about 90%, at least about 95%, at least about 98%, or at least about 99% of the maximum cross sectional dimension of the electrode formed using the porous continuous structure.

The use of such relatively large porous continuous structures can, in some embodiments, ensure that little or no binder is located within the electrode because binder would not be required to hold together small particles to form the porous support structure. In some embodiments, the electrode can include less than about 20 wt %, less than about 10 wt %, less than about 5 wt %, less than about 2 wt %, less than about 1 wt %, or less than about 0.1 wt % binder. In this context, "binder" refers to material that is not an electrode active material and is not included to provide an electrically conductive pathway for the electrode. For example, an electrode might contain binder to facilitate internal cohesion within the cathode.

The porous support structure may comprise any suitable material. In some embodiments, the porous support structure can be used as an electrical conductor within the electrode (e.g., as an electrolyte-accessible conductive material). Accordingly, the porous support structure may comprise an electrically conductive material. Examples of electrically conductive materials that may be suitable for use include, but are not limited to, metals (e.g., nickel, copper, aluminum, iron, or any other suitable metal or combination in pure or alloyed form), carbon (e.g., graphite, carbon black, acetylene black, carbon fibers, carbon nanofibers, hallow carbon tubes, graphene, carbon filaments, etc.), electrically conductive polymers, or any other suitable electrically conductive material. In some embodiments, the bulk of the porous support structure may be formed from an electrically conductive material. In some cases, the porous support structure may comprise an electrically non-conductive material that is at least partially coated (e.g., via solution-based deposition, evaporative deposition, or any other suitable technique) with a conductive material. In some embodiments, the porous support structure may comprise a glass (e.g., silicon dioxide, amorphous silica, etc.), a ceramic (e.g., aluminum oxide, tin oxide, vanadium oxide, and others described below), a semiconductor (e.g., silicon, germanium, gallium arsenide, etc.), non-conductive polymers, and the like.

The porous support structure may comprise pores with a size distribution chosen to enhance the performance of the electrochemical cell. In some cases, the porous support structure may comprise pores than are larger than sub-nanometer scale and single-nanometer scale pores, which can be too small to allow for the passage of electrolyte (e.g., liquid electrolyte) into the pores of the electrode due to, for example, capillary forces. In addition, in some cases, the pores may be smaller than millimeter-scale pores, which may be so large that they render the electrode mechanically unstable. In some embodiments, the porous support structure can comprise a plurality of pores, wherein each pore of the plurality of pores has a pore volume, and the plurality of pores has a total pore volume defined by the sum of each of the individual pore volumes. In some embodiments, at least about 50%, at least about 70%, at least about 80%, at least about 90%, at least about 95%, at least about 99%, or substantially all of the total pore volume is occupied by pores having cross-sectional diameters of between about 0.1 microns and about 10 microns. In some embodiments, at least about 50%, at least about 70%, at least about 80%, at least about 90%, at least about 95%, at least about 99%, or substantially all of the total pore volume is occupied by pores having cross-sectional diameters of between about 0.1 microns and about 20 microns, between about 1 micron and about 10 microns, or between about 1 micron and about 3 microns. Stated another way, in some embodiments, the plurality of pores of the porous support structure together defines a total pore volume, and at least about 50% (or at least about 70%, at least about 80%, at least about 90%, at least about 95%, at least about 99%, or substantially all) of the total pore volume is defined by pores having cross-sectional diameters of between about 0.1 microns and about 10 microns (or between about 0.1 microns and about 20 microns, between about 1 micron and about 10 microns, or between about 1 micron and about 3 microns).

In some embodiments, it may be advantageous to use porous materials wherein the plurality of pores has an average cross-sectional diameter within a designated range. For example, in some cases, the porous support material may comprise a plurality of pores wherein the average cross-sectional diameter of the plurality of pores is between about 0.1 microns and about 10 microns, between about 1 micron and about 10 microns, or between about 1 micron and about 3 microns.

As described below, the pore distributions described herein can be achieved, in some cases, while an anisotropic force (e.g., defining a pressure of between about 4.9 Newtons/cm$^2$ and about 198 Newtons/cm$^2$, or any of the ranges outlined below) is applied to the electrochemical cell. This can be accomplished by fabricating the porous support structure from materials (e.g., metals, ceramics, polymers, etc.) capable of maintaining their porosities under applied loads. Fabricating an electrode from a material which resists deformation under an applied load can allow the electrode to maintains its permeability under pressure, and allows the cathode to maintain the enhanced rate capabilities described herein. In some embodiments, the yield strength of the porous support structure (and the resulting electrode produced from the porous support structure) can be at least about 200 Newtons/cm$^2$, at least about 350 Newtons/cm$^2$, or at least about 500 Newtons/cm$^2$. Methods of fabricating such structures are described in more detail below.

As used herein, the "cross-sectional diameter" of a pore refers to a cross-sectional diameter as measured using ASTM Standard Test D4284-07. The cross-sectional diameter can refer to the minimum diameter of the cross-section of the pore. The "average cross-sectional diameter" of a plurality of pores refers to the number average of the cross-sectional diameters of each of the plurality of the pores.

One of ordinary skill in the art would be capable of calculating the distribution of cross-sectional diameters and the average cross-sectional diameter of the pores within a porous structure using mercury intrusion porosimetry as described in ASTM standard D4284-92, which is incorporated herein by reference in its entirety. For example, the methods described in ASTM standard D4284-92 can be used to produce a distribution of pore sizes plotted as the cumulative intruded pore volume as a function of pore diameter. To calculate the percentage of the total pore volume within the sample that is occupied by pores within a given range of pore diameters, one would: (1) calculate the area under the curve that spans the given range over the x-axis, (2) divide the area calculated in step (1) by the total area under the curve, and (3) multiply by 100%. Optionally, in cases where the article includes pore sizes that lie outside the range of pore sizes that can be accurately measured using ASTM standard D4284-92, porosimetry measurements may be supplemented using BET surface analysis, as described, for example, in S. Brunauer, P. H. Emmett, and E. Teller, *J. Am. Chem. Soc.*, 1938, 60, 309, which is incorporated herein by reference in its entirety.

In some embodiments, the porous material may comprise pores with relatively uniform cross-sectional diameters. Not wishing to be bound by any theory, such uniformity may be useful in maintaining relatively consistent structural stability throughout the bulk of the porous material. In addition, the ability to control the pore size to within a relatively narrow range can allow one to incorporate a large number of pores that are large enough to allow for fluid penetration (e.g., electrolyte penetration) while maintaining sufficiently small pores to preserve structural stability of the porous material. In some embodiments, the distribution of the cross-sectional diameters of the pores within the porous material can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

The electrodes described herein can also comprise a material substantially contained within the pores of the porous support structure. A material that is said to be "substantially contained" within a pore is one that at least partially lies within the imaginary volume defined by the outer boundaries of the pore. For example, a material substantially contained within a pore can be fully contained within the pore, or may only have a fraction of its volume contained within the pore, but a substantial portion of the material, overall, is contained within pores. In one set of embodiments, material (e.g., material comprising sulfur) is provided, at least 30% of which by mass is contained within pores of a porous support structure. In other embodiments, at least 50%, 70%, 80%, 85%, 90%, or 95% by mass of the material is contained within the pores of the support structure.

The material within the support structure can comprise, in some cases, particles, which may be substantially solid or porous. In some embodiments, the material substantially contained within the pores may comprise isolated particles or agglomerated particles. In some embodiments, the material may comprise a film (which may be substantially solid or porous) on at least a portion of the pores within the support structure. In some embodiments, the material may substantially fill at least a portion of the pores within the support structure, such that the material assumes the shape and/or size of the portion of the pores.

The material within the support structure may comprise, in some cases, an electrode active material. As used herein, the term "electrode active material" refers to any electrochemically active species associated with an electrode. For example, a cathode active material refers to any electrochemically active species associated with the cathode, while an anode active material refers to any electrochemically active species associated with an anode.

In some embodiments, the electrodes of the present invention may comprise a relatively large amount of material comprising electrode active material within the pores of the porous support. For example, in some embodiments, the electrode (e.g., cathode) may comprise at least about 20 wt %, at least about 35 wt %, at least about 50 wt %, at least about 65 wt %, or at least about 75 wt % material comprising electrode active material, such as the electroactive sulfur-containing materials described herein.

The material within the pores of the porous support structure may comprise a variety of compositions. In some embodiments, the material within the pores can comprise sulfur. For example, the material within the pores can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In another embodiment, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers.

In some embodiments, an electroactive sulfur-containing material of a cathode active layer comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al. of the common assignee, and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur, as the active electrode species, is described predominately, it is to be understood that wherever sulfur is described as the active electrode species herein, any suitable electrode active species may be used. Those of ordinary skill in the art will appreciate this and will be able to select species (e.g., from the list described below) for such use.

In embodiments in which the material within the pores comprises particles (e.g., particles of electrode active material), the particles can be of any suitable shape. For example, in some embodiments, the particles may be substantially spherical. In some cases, a particle can be similar in shape to the pore it occupies (e.g., cylindrical, prismatic, etc.).

The size of the particles (e.g., particles of electrode active material) within the pores of the porous support structure can be selected to enhance the performance of the electrochemical cell. In some embodiments, each particle of the plurality of particles within the pores of the porous support structure has a particle volume, and the plurality of particles has a total particle volume defined by the sum of each of the individual particle volumes. In addition, in some embodiments, each particle of the plurality of particles within the pores of the porous support structure has a maximum cross-sectional dimension. In some instances, at least about 50%, at least about 70%, at least about 80%, at least about 90%, at least about 95%, at least about 99%, or substantially all of the total particle volume within the pores of the porous support structure is occupied by particles having maximum cross-sectional dimensions of between about 0.1 microns and about 10 microns. In some embodiments, at least about 50%, at least about 70%, at least about 80%, at least about 90%, at least about 95%, at least about 99%, or substantially all of the total particle volume within the pores of the porous support structure is occupied by particles having maximum cross-sectional dimensions of between about 1 micron and about 10 microns, or between about 1 micron and about 3 microns. Stated another way, in some embodiments, the plurality of particles together defines a total quantity of particulate material, and at least about 50% (or at least about 70%, at least about 80%, at least about 90%, at least about 95%, at least about 99%, or substantially all) of the total quantity of particulate material is made up of particles having maximum cross-sectional dimensions of between about 0.1 microns and about 10 microns (or between about 1 micron and about 10 microns, or between about 1 micron and about 3 microns).

As used herein, the "maximum cross-sectional dimension" of a particle refers to the largest distance between two opposed boundaries of an individual particle that may be measured. The "average maximum cross-sectional dimension" of a plurality of particles refers to the number average of the maximum cross-sectional dimensions of the plurality of particles.

One of ordinary skill in the art would be capable of measuring the maximum cross-sectional dimension of a particle by, for example, analyzing a scanning electron micrograph (SEM) of a particle. In embodiments comprising agglomerated particles, the particles should be considered separately when determining the maximum cross-sectional dimensions. The measurement could be performed by establishing imaginary boundaries between each of the agglomerated particles, and measuring the maximum cross-sectional dimension of the hypothetical, individuated particles that result from establishing such boundaries. The distribution of maximum cross-sectional dimensions and particle volumes could also be determined by one of ordinary skill in the art using SEM analysis. The total particle volume of the particles within the pores could be determined by one of ordinary skill in the art by employing mercury intrusion porosimetry according to ASTM Standard Test D4284-07 (optionally with BET surface analysis) to measure the volume within the pores before and after the particles are disposed within the pores. When the material inside the pores of the support structure is itself porous, mercury intrusion porosimetry measurements (with optional BET surface analysis) may be supplemented with visual analysis of SEM micrographs to determine the volume occupied by the material (e.g., particles) within the pores.

In some embodiments, the particles of material (e.g., electrode active material) within the porous support structure may have an average maximum cross-sectional dimension within a designated range. For example, in some cases, the particles of material (e.g., electrode active material) within the porous support structure can have an average maximum cross-sectional dimension of between about 0.1 microns and about 10 microns, between about 1 micron and about 10 microns, or between about 1 micron and about 3 microns. In some embodiments, the ratio of the average maximum cross-sectional dimension of the particles of material within the porous support structure to the average cross-sectional diameter of the pores within the porous support structure can be between about 0.001:1 and about 1:1, between about 0.01:1 and about 1:1, or between about 0.1:1.

In some embodiments, particles within the pores of the porous support structure can have relatively uniform maximum cross-sectional dimensions. Not wishing to be bound by any theory, such uniformity may be useful in producing relatively consistent performance along a surface of an electrode comprising electrode active material particles. In some embodiments, the distribution of the cross-sectional dimensions of the pores within the porous material can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated, and expressed as a percentage relative to an average, as described above.

In some embodiments, the material (e.g., particles) within the pores of the porous support structure may occupy a relatively large percentage of the pore volume. For example, in some embodiments, the material within the porous support structure (e.g., particles comprising an electrode active material) can occupy at least about 10%, at least about 20%, at least about 35%, at least about 50%, at least about 70%, or more of the accessible pore volume of the porous support structure. As used herein, the "accessible pore volume" is consistent with the above definition of a pore and refers to the percentage of the pore volume that is exposed to the external environment surrounding a porous article, as opposed to pore volume that is completely enclosed by the material forming the porous article. The volume occupied by material within the pores should be understood to include an imaginary volume that surrounds the outer boundaries of the material (e.g., particles) within the pores, which may include material (e.g. particle) void volume in cases where the material within the pores is itself porous. One of ordinary skill in the art is capable of calculating the percentage of accessible pore volume, for example, using mercury intrusion porosimetry measurements according to ASTM Standard Test D4284-07, optionally supplemented by BET surface analysis. The percentage of accessible pore volume within a porous article that is occupied by particles can be calculated, for example, by performing mercury intrusion porosimetry measurements (optionally with BET surface analysis) of the porous article before and after the particles are positioned within the pores. When the material inside the pores of the support structure is itself porous, mercury intrusion porosimetry measurements (with optional BET surface analysis) may be supplemented with visual analysis of SEM micrographs to determine the volume occupied by the material (e.g., particles) within the pores.

The electrodes comprising the porous support structure may comprise a relatively high percentage of electrode active material (e.g., sulfur), in some cases. In some embodiments, the electrodes comprising the porous support structure can comprise, for example, at least about 20 wt %, at least about 30 wt %, at least about 40 wt %, or more electrode active material. It should be understood that, for the purposes of calculating the amount of electrode active material within an electrode, only the weight of the electrode active species is counted. For example, in cases where electroactive sulfur-containing materials such as polysilfides or organic materials comprising sulfur, only the sulfur content of the electroactive sulfur-containing materials is counted in determining the percentage of electrode active material within the electrode. In some embodiments, the electrodes comprising the porous support structure can comprise at least about 20 wt %, at least about 30 wt %, at least about 40 wt %, or more sulfur.

The electrodes described herein can comprise any suitable weight ratio of electrode active material and support material (e.g., any suitable ratio of sulfur to carbon). For example, in some embodiments, the electrode can comprise a weight ratio of sulfur to carbon of at least about 1:1, at least about 2:1, at least about 3:1, at least about 4:1, at least about 5:1, or at least about 6:1. In some embodiments, the electrode can comprise a weight ratio of sulfur to carbon of less than about 6:1, less than about 5:1, less than about 4:1, less than about 3:1, less than about 2:1, or less than about 1:1.

In some cases, the concentration of the electrode active material (e.g., sulfur within a cathode) can be relatively consistent across one or more surfaces of the electrode, or across any cross-section of the electrode. In some embodiments, at least about 50%, at least about 75%, at least about 85%, at least about 90%, at least about 95%, or at least about 98% of the area of the surface of an electrode (e.g., cathode) defines a uniform area that includes a uniform distribution of electrode active material (e.g., sulfur). In some embodiments, at least about 50%, at least about 75%, at least about 85%, at least about 90%, at least about 95%, or at least about 98% of the area of a surface of a cross-section substantially perpendicular to the thickness of an electrode (e.g., a cathode) defines a uniform area that includes a uniform distribution of electrode active material (e.g., sulfur).

In this context, a "surface of an electrode" refers to the geometric surface of the electrode, which will be understood by those of ordinary skill in the art to refer to the surface defining the outer boundaries of the electrode, for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.). In addition, a "cross-section of an electrode" defines an approximate plane viewed by cutting (actually or theoretically) the electrode to expose the portion one wishes to analyze. After the electrode has been cut to observe the cross-section, the "surface of the cross-section of the electrode" corresponds to the exposed geometric surface. Stated another way, "surface of an electrode" and "surface of the cross-section of the electrode" refer, respectively, to the geometric surface of the electrode and the geometric surface of a cross-section of the electrode.

In some embodiments, an electrode active material (e.g., sulfur) is uniformly distributed when any continuous area that covers about 10%, about 5%, about 2%, or about 1% of the uniform area (described in the preceding paragraphs) includes an average concentration of the electrode active material (e.g., sulfur) that varies by less than about 25%, less than about 10%, less than about 5%, less than about 2%, or less than about 1% relative to the average concentration of the electrode active material (e.g., sulfur) across the entirety of the uniform area. In this context, the "average concentration" of an electrode active material refers to the percentage of the surface area of the electrode (e.g., exposed surface area, surface area of a cross section of the electrode) that is occupied by electrode active material when the electrode is viewed from an angle substantially perpendicularly to the electrode.

One of ordinary skill in the art would be capable of calculating average electrode active material concentrations within a surface or a cross-section of an electrode, and the variance in concentrations, by analyzing, for example, X-ray spectral images of an electrode surface or cross-section. For example, one could obtain an x-ray spectral image of an electrode surface or cross-section (e.g., by physically slicing the electrode to produce the cross-section), such as the images shown in FIG. E6A-E6C. To calculate the average concentration of sulfur over a given area in such an image, one would determine the percentage of the image that is occupied by the color corresponding to sulfur over that area. To determine whether the average concentration within a sub-area varies by more than X % relative to the average concentration within a larger area, one would use the following formula:

$$\text{Variance}(\%) = \left| \frac{C_L - C_{sub}}{C_L} \right| \cdot 100\%$$

wherein $C_L$ is the average concentration within the larger area (expressed as a percentage), $C_{sub}$ is the average concentration within the sub-area (expressed as a percentage). As a specific example, if the average concentration of the electrode active material within a sub-area is 12%, and the average concentration of the electrode active material within a larger area is 20%, the variance would be 40%.

Stated another way, in some embodiments, at least about 50% (or at least about 75%, at least about 85%, at least about 90%, at least about 95%, or at least about 98%) of the area of the surface of the electrode (or of a cross-section of the electrode) defines a first, continuous area of essentially uniform sulfur distribution, the first area having a first average concentration of sulfur. In some cases, any continuous area that covers about 10% (or about 5%, about 2%, or about 1%) of the first, continuous area of the surface of the electrode (or of the cross section of the electrode) includes a second average concentration of sulfur that varies by less than about 25% (or less than about 10%, less than about 5%, less than about 2%, or less than about 1%) relative to the first average concentration of sulfur across the first, continuous area.

In another aspect, a method of making an electrode for use in an electrochemical cell is described. The method may comprise, in some embodiments, depositing a material (e.g., particles) substantially within the pores of a porous support structure. The material deposited in the pores of the porous support structure can comprise an electrode active material such as, for example, sulfur. The porous support structure and the material can possess any of the characteristics (e.g., materials, sizes, porosities, etc.) described herein.

Porous support structures (and resulting electrodes) can be fabricated using a variety of methods. For example, in some embodiments, particles can be suspended in a fluid, and the fluid can be subsequently removed (e.g., via heat drying, vacuum drying, filtration, etc) to produce the porous support structure in which the particles are adhered to each other. As mentioned above, in some cases, a binder can be used to adhere particles to form a composite porous support structure.

In some embodiments, porous support structures can be fabricated by heating individual particles of a material until the particles are altered to form a porous support structure (e.g., a porous continuous structure). In some embodiments, particles (e.g., metallic particles, ceramic particles, glass particles, etc.) can be arranged such that they are in contact with each other, with interstices located between the particles. The particles can then be sintered to form a fused structure in which the interstices between the particles constitute the pores in the sintered structure. As used herein, "sintering" is given its normal meaning in the art, and is used to refer to a method for making objects from particles, by heating the particles below their melting point until the particles adhere to each other. The total porosity, size of the pores, and other properties of the final structure could be controlled by selecting appropriate particles sizes and shapes, arranging them to form a desired packing density prior to sintering, and selecting appropriate sintering conditions (e.g., heating time, temperature, etc.).

In some cases, particles (e.g., polymeric particles, metallic particles, glass particles, ceramic particles, etc.) particles arranged such that they are in contact with each other can be heated such that the particles melt to form a porous continuous structure. The interstices of the original structure can form the pores of the porous continuous structure in some such embodiments. The total porosity, size of the pores, and other properties of the final structure could be controlled by selecting appropriate particles sizes and shapes, arranging them to form a desired packing density prior to heating, and selecting appropriate heating conditions (e.g., heating time, temperature, etc.).

In some embodiments, the particles can be controllably arranged prior to melting or sintering. For example, in some cases in which the particles are used to form a porous layer, it can be advantageous to arrange the particles such that they are distributed relatively evenly and relatively flatly against a substrate. This can be achieved, for example, by suspending the particles in a solvent that is volatile (e.g., at room temperature), and pouring the solvent onto the substrate on which the porous structure is to be formed. After the particle solvent is deposited, the volatile solvent can be allowed to evaporate, leaving behind a relatively well-ordered array of particles.

The sintering and/or melting processes described herein can be carried out in a controlled atmosphere, in some cases. For example, the volume in which melting or sintering is performed can be filled with a relatively inter gas (e.g., nitrogen, argon, helium, and the like), in some cases. In some instances, the melting and/or sintering can be carried out in the substantial absence of oxygen, which can reduce or eliminate oxidation and/or combustion of the material used to form the porous support structure. In some embodiments, a reducing atmosphere (e.g., forming gas with the balance nitrogen and/or argon, hydrogen, or the like) can be used to reduce the final oxygen content of the sintered and/or melted article.

The sintering and/or melting temperature can be selected based upon the material being used to form the porous support structure. For example, when melting particles to form the porous support structure, the heating temperature can be selected such that it is above the melting temperature of the material from which the particles are made. One of ordinary skill in the art would be capable of selecting an appropriate sintering temperature, based upon the type of material being sintered. For example, suitable sintering temperatures for nickel might be between about 700° C. and about 950° C.

As mentioned above, the sizes and shapes of the particles used to form the porous support structure can be selected to achieve a desired porosity. In some embodiments, the particles can be substantially spherical, although particles with other cross-sectional shapes (e.g., ellipses, polygons (e.g., rectangles, triangles, squares, etc.), irregular, etc.) can also be used. The particles can be relatively small (e.g., in the form of a powder), in some embodiments. For example, in some cases, at least about 50%, at least about 70%, at least about 80%, at least about 90%, at least about 95%, at least about 99%, or substantially all of the particles have maximum cross-sectional dimensions of between about 0.5 microns and about 20 microns or between about 3 microns and about 5 microns. Such particle sizes can be useful in producing porous support structures with the advantageous porosity properties described elsewhere in this application.

In some embodiments, the porous support structure can be formed by combining a first material with a second material, and forming the pores of the support structure by removing one of the materials from the mixture. Removing one of the materials from the mixture can leave behind voids which ultimately form the pores of the porous support structure. In some cases, the structure of the non-removed material can be substantially maintained while one or more of the materials within the mixture is removed. For example, in some cases, the support structure material (e.g., a metal, ceramic, glass, polymer, etc. which might be melted) or a precursor to the support structure material (e.g., which might be converted to form the material of the porous support structure via, for example, a reaction (e.g., polymerization, precipitation, etc.)), can be mixed with a plurality of templating entities. The templating entities can be arranged such that they form an interconnected network within the support structure material or precursor. After the templating entities have been arranged within the support structure material, they can be removed from the support structure material to leave behind pores. The support structure material can be hardened before the templating entities are removed and/or during the removal of the templating entities. As used herein, the term "hardened" is used to refer to the process of substantially increasing the viscosity of a material, and is not necessarily limited to solidifying a material (although in one set of embodiments, a porous support structure material is hardened by converting it into a solid). A material can be hardened, for example, by gelling a liquid phase. In some instances, a material can be hardened using polymerization (e.g., IR- or UV-induced polymerization). In some cases, a material can being hardened can go through a phase change (e.g., reducing the temperature of a material below its freezing point or below its glass transition temperature). A material may also be hardened by removing a solvent from a solution, for example, by evaporation of a solvent phase, thereby leaving behind a solid phase material.

The templating entities can be of any suitable phase. In some cases, the templating entities can be solid particles. For example, the templating entities might comprise silica particles, which can be dissolved out of a porous structure using, for example, hydrofluoric acid. As another example, the templating entities might comprise ammonium bicarbonate, which can be removed by dissolving it in water. In some embodiments, the templating entities can comprise fluid (e.g., liquid and/or gas) bubbles.

The templating entities can also have any suitable shape, regular or irregular, including, but not limited to, spheres, cubes, pyramids, or a mixture of these and/or other shapes. The templating entities may also each be formed of any suitable size. In some embodiments, the templating entities may have an average maximum cross-sectional dimension roughly equivalent to the size of the desired pores within the porous support structure.

As a specific example, a metallic porous support structure can be fabricated using metal injection molding. In an exemplary process, a "green" of metal particles, binder, and templating entities can be formed into a suitable structure (e.g., a relatively thin sheet) via injection molding. As the green is heated, the metal particles can be melted or sintered together while the binder and templating entities can be burned off, leaving behind a series of pores.

Porous ceramic structures can also be produced using a templating methods. For example, in some cases, a ceramic foam can be produced by including ceramic particles and templating entities within a polyaphron solution (i.e., a bi-liquid foam). The resulting mixture can be used in a sol gel solution, which can form a stable emulsion with the use of, for example, appropriate surfactants. Once the gel has been hardened, the templating entities can be removed by heat treatment. The size of the polyaphrons can be controlled by varying the type and amount of the surfactants in the bi-liquid foam.

Templating methods can also be used to produce porous polymeric structures. For example, a plurality of solid particles might be dispersed within a monomer solution. After the monomer is polymerized to form a polymer, the solid particles can be selectively dissolved out of the mixture to leave behind a series of pores within the rest of the polymeric structure.

Another method that might be used to produce the porous support structures described herein includes 3D printing. 3D printing is known to those of ordinary skill in the art, and refers to a process by which a three dimensional object is created by shaping successive layers, which are adhered on top of each other to form the final object. 3D printing can be used with a variety of materials, including metals, polymers, ceramics, and others.

A variety of materials (e.g., in particle form, in melt form, or other forms mentioned herein) can be used to form the porous support structure. The material used to form all or part of the porous support structure can include a metal or a metal alloy, in some embodiments. Suitable metals include, but are not limited to, nickel, copper, magnesium, aluminum, titanium, scandium, and alloys and/or combinations of these. In some embodiments, the metal or metal alloy from which the particles are formed can have a density of less than about 9 $g/cm^3$ or less than about 4.5 $g/cm^3$.

In some embodiments, a polymeric material can be used to form all or part of the porous support structure. Suitable polymers for use in forming porous support structures include, but are not limited to, polyvinyl alcohol (PVA), phenolic resins (novolac/resorcinol), lithium polystyrenesulfonate (LiPSS), epoxies, UHMWPE, PTFE, PVDF, PTFE/vinyl copolymers, co-polymers/block co-polymers of the above and others. In some embodiments, two polymers can be used for their unique functionalities (e.g. PVA for adhesion, and LiPSS for rigidity, or resorcinol for rigidity and an elastomer for flexibility/toughness). The material used to form the porous support structure might include one or more conductive polymers such as, for example, poly(3,4-ethylenedioxythiphene) (PEDOT), poly(methylenedioxythiophene) (PMDOT), other thiophenes, polyaniline (PANI), polypyrrole (PPy). Those of ordinary skill in the art would be capable of selecting a counter ion for a conductive polymer system, which can be selected from a variety of chemical species such as PSS for PEDOT, other well known conductive polymers, and co and block co-polymers as above.

A ceramic material might be used to form all or part of a porous support structure, in some instances. Suitable ceramics include, but are not limited to, oxides, nitrides, and/or oxynitrides of aluminum, silicon, zinc, tin, vanadium, zirconium, magnesium, indium, and alloys thereof. In some cases, the porous support structure can include any of the oxides, nitrides, and/or oxynitrides above doped to impart desirable properties, such as electrical conductivity; specific examples of such doped materials include tin oxide doped with indium and zinc oxide doped with aluminum. The material used to form the porous support structure can comprise glass (e.g., quartz, amorphous silica, chalcogenides, and/or other conductive glasses) in some embodiments. The porous support structure can include, in some cases, aerogels and/or xero gels of any of the above materials. In some cases, the porous support structure can include a vitreous ceramic.

In some embodiments in which the bulk of the porous support structure is made of a material that is substantially electrically non-conductive, electrically conductive material can be deposited within the pores of the support structure to impart electrical conductivity. For example, the bulk of the porous support structure might comprise a ceramic (e.g., glass) or an electrically non-conductive polymer, and a metal might be deposited within the pores of the support structure. The electrically conductive material can be deposited, for example, via electrochemical deposition, chemical vapor deposition, or physical vapor deposition. In some cases, after the deposition of the electrically conductive material, an electrode active material can be deposited within the pores of the porous support structure. Suitable materials for placement within the pores of the porous support structure to impart electrical conductivity include, but are not limited to carbon and metals such as nickel and copper, and combinations of these.

The bulk of the porous support structure can be made electrically conductive, in some embodiments, by incorporating one or more electrically conductive materials into the bulk of the porous support structure material. For example, carbon (e.g., carbon black, graphite or graphene, carbon fibers, etc.), metal particles, or other electrically conductive materials might be incorporated into a melt (e.g., a non-conductive polymeric melt, a glass melt, etc.) which is used to form a polymeric porous support structure to impart electrical conductivity to the porous support structure. After the melt is hardened, the electrically conductive material can be included within the bulk of the porous support structure.

The mechanical properties of the porous support structure can also be enhanced by incorporating materials that structurally reinforce the porous support structure into the bulk of the porous support structure. For example, carbon fibers and/or particulate fillers can be incorporated into a melt (e.g., a metallic melt, a glass melt, a polymeric melt, etc.) which is hardened to form a porous support structure. In some cases, carbon fibers and/or particulate fillers can be incorporated into a solution in which the porous support structure is formed (e.g., in some cases in which the porous support structure comprises a polymer).

In some embodiments, the surfaces on or within of the porous support structure may be activated or modified prior to depositing the material, for example, to provide for enhanced attachment of material to the surfaces of the porous support structure. Porous support structures can be activated or modified by exposing the porous material to reactive or unreactive gasses or vapors. In some embodiments, the activation or modification steps can be performed at elevated temperatures (e.g., at least about 50° C., at least about 100° C., at least about 250° C., at least about 500° C., at least about 750° C., or higher) and/or aub-atmospheric pressures (e.g., less than about 760 torr, less than about 250 torr, less than about 100 torr, less than about 10 torr, less than about 1 torr, less than about 0.1 torr, less than about 0.01 torr, or lower).

Electrode active material (e.g., particles, films, or other forms comprising electrode active material) may be deposited within the pores of the porous support structure via a variety of methods. In some embodiments, electrode active material is deposited by suspending or dissolving a particle precursor (e.g., a precursor salt, elemental precursor material such as elemental sulfur, and the like) in a solvent and exposing the porous support structure to the suspension or solution (e.g., via dipping the porous support structure into the solvent, by spraying the solvent into the pores of the porous support structure, and the like). The particle precursor may subsequently form particles within the pores of the support structure. For example, in some cases, the precursor may form crystals within the pores of the support structure. Any suitable solvent or suspension medium may be used in conjunction with such a technique including aqueous liquids, non-aqueous liquids, and mixtures thereof. Examples of suitable solvents or suspension media include, but are not limited to, water, methanol, ethanol, isopropanol, propanol, butanol, tetrahydrofuran, dimethoxyethane, acetone, toluene, xylene, acetonitrile, cyclohexane, and mixtures thereof. Of course, other suitable solvents or suspension media can also be used as needed.

Electrode active material can also be deposited within the pores of the support structure, in some cases, by heating a material above its melting point or boiling point (optionally adjusting the surrounding pressure to, for example, aid in evaporation). The heated material may then be flowed or vaporized into the pores of the support material such that particulate deposits or other solids are formed. As a specific example, elemental sulfur powder can be positioned next to a porous support material and heated above the melting point of sulfur, such that the sulfur flows into the pores of the material (e.g., via sublimation, via liquid flow). The composite can then be cooled such that the sulfur deposits within the pores.

In some embodiments, electrode active material can be deposited within the pores of the support structure via electrochemical deposition, chemical vapor deposition, or physical vapor deposition. For example, metals such as aluminum, nickel, iron, titanium, and the like, can be electrochemically deposited within the pores of a porous support structure. Alternatively, such materials may be deposited, for example, using a physical vapor deposition technique such as, for example, electron beam deposition.

In some embodiments, catalyst may be deposited within the pores of the support structure in addition to the electrode active material (e.g., before or during the deposition of the electrode active material). In some cases, the catalyst may catalyze the electrochemical conversion of the electrode active material (e.g., the conversion of sulfur to $Li_2S$ and/or the conversion of $Li_2S$ to sulfur). Suitable catalyst can include, for example, cobalt phthalocyanine and transition metal salts, complexes, and oxides (e.g., $Mg_{0.6}Ni_{0.4}O$).

The electrodes described herein may comprise one or more advantageous properties. In some embodiments, the electrode may exhibit a relatively high porosity. In some cases, the porosity of the electrode may be at least about 30%, at least about 40%, at least about 50%, at least about 60%, at least about 70%, at least about 80%, or at least about 90%. Such porosities (and any of the pore distributions described herein) may be achieved, in some cases, while an anisotropic force (e.g., defining a pressure of between about 4.9 Newtons/$cm^2$ and about 198 Newtons/$cm^2$, or any of the ranges outlined below) is applied to the electrochemical cell. As used herein, the percentage porosity of an electrode (e.g., the cathode) is defined as the void volume of the electrode divided by the volume within the outer boundary of the electrode, expressed as a percentage. "Void volume" is used to refer to portions of an electrode that are not occupied by electrode active material (e.g., sulfur), conductive material (e.g., carbon, metal, etc.), binder, or other materials that provide structural support. The void volume within the electrode may comprise pores in the electrode as well as interstices between aggregates of the electrode material. Void volume may be occupied by electrolyte, gases, or other non-electrode materials. In some embodiments, the void volume of the electrode may be at least about 1, at least about 2, at least about 4, or at least about 8 $cm^3$ per gram of electrode active material (e.g., sulfur) in the electrode.

In some embodiments, the electrode can comprise a relatively large electrolyte accessible conductive material area. As used herein, "electrolyte accessible conductive material area" is used to refer to the total surface area of the conductive material (e.g., carbon) within the electrode that can be contacted by electrolyte. For example, electrolyte accessible conductive material area may comprise conductive material surface area within the pores of the electrode, conductive material surface area on the external surface of the electrode, etc. In some instances, electrolyte accessible conductive material area is not obstructed by binder or other materials. In addition, in some embodiments, electrolyte accessible conductive material area does not include portions of the conductive material that reside within pores that restrict electrolyte flow due to surface tension effects. In some cases, the electrode comprises an electrolyte accessible conductive material area (e.g., an electrolyte accessible carbon area, an electrolyte accessible metal area) of at least about 1 $m^2$, at least about 5 $m^2$, at least about 10 $m^2$, at least about 20 $m^2$, at least about 50 $m^2$, or at least about 100 $m^2$ per gram of electrode active material (e.g., sulfur) in the electrode. The relatively large electrolyte accessible conductive material areas described above can be achieved, in some cases, while an anisotropic force (e.g., defining a pressure of between about 4.9 Newtons/$cm^2$ and about 198 Newtons/$cm^2$, or any of the ranges outlined below) is applied to the electrochemical cell.

Although the electrodes described herein can find use in a wide variety of electrochemical devices, an example of one such device is provided in FIG. 1 for illustrative purposes only. A general embodiment of an electrochemical cell can include a cathode, an anode, and an electrolyte layer in electrochemical communication with the cathode and the anode. In some cases, the cell also may comprise a containment structure. The components may be assembled, in some cases, such that the electrolyte is placed between the cathode and anode in a stacked configuration. FIG. 1 illustrates an electrochemical cell of the invention. In the embodiment shown, cell 10 includes a cathode 30 that can be formed on a substantially planar surface of substrate 20. While the cathode and substrate in FIG. 1 are shown as having a planar configuration, other embodiments may include non-planar configurations, as will be discussed in more detail later. As noted above, the cathode and/or anode can include a porous support structure within which electrode active material is contained. For example, in a lithium-sulfur battery, the cathode can comprise a porous support structure within which a electroactive sulfur-containing material is contained.

The cathode may comprise a variety of cathode active materials. For example, the cathode may comprise a sulfur-containing material, wherein sulfur is the cathode active material. Other examples of cathode active materials are described more fully below. In some embodiments, cathode 30 comprises at least one active surface (e.g., surface 32). As used herein, the term "active surface" is used to describe a surface of an electrode that is in physical contact with the electrolyte and at which electrochemical reactions may take place.

An electrolyte 40 (e.g., comprising a porous separator material) can be formed adjacent the cathode 30. In some embodiments, electrolyte 40 may comprise a non-solid electrolyte, which may or may not be incorporated with a porous separator. As used herein, the term "non-solid" is used to refer to materials that are unable to withstand a static shear stress, and when a shear stress is applied, the non-solid experiences a continuing and permanent distortion. Examples of non-solids include, for example, liquids, deformable gels, and the like.

Electrochemical cells described herein may make use of a relatively low mass of electrolyte relative to the mass of the cathode active material or the anode active material, in some embodiments. For example, in some instances, the ratio of electrolyte to cathode active material (e.g., sulfur) or anode active material, by mass, within the electrochemical cell is less than about 6:1, less than about 5:1, less than about 4:1, less than about 3:1, or less than about 2:1.

An anode layer 50 can be formed adjacent electrolyte 40 and may be in electrical communication with the cathode 30. The anode may comprise a variety of anode active materials. For example, the anode may comprise a lithium-containing material, wherein lithium is the anode active material. Other examples of anode active materials are described more fully below. In some embodiments, anode 50 comprises at least one active surface (e.g., surface 52). The anode 50 may also be formed on an electrolyte layer positioned on cathode 30, for example on electrolyte 40. Of course, the orientation of the components can be varied, and it should be understood that there are other embodiments in which the orientation of the layers is varied such that, for example, the anode layer or the electrolyte layer is first formed on the substrate.

Optionally, the cell may also include, in some embodiments, containment structure 56. In addition, the cell may also, optionally, include additional layers (not shown), such as a multi-layer structure that protects an electroactive material (e.g., an electrode) from the electrolyte, may be present, as described in more detail in U.S. patent application Ser. No. 11/400,781, filed Apr. 6, 2006, entitled, "Rechargeable Lithium/Water, Lithium/Air Batteries" to Affinito et al., which is incorporated herein by reference in its entirety. Additionally, non-planar arrangements, arrangements with proportions of materials different than those shown, and other alternative arrangements are useful in connection with the present invention. A typical electrochemical cell also would include, of course, current collectors, external circuitry, housing structure, and the like. Those of ordinary skill in the art are well aware of the many arrangements that can be utilized with the general schematic arrangement as shown in the figures and described herein.

Figure 2:
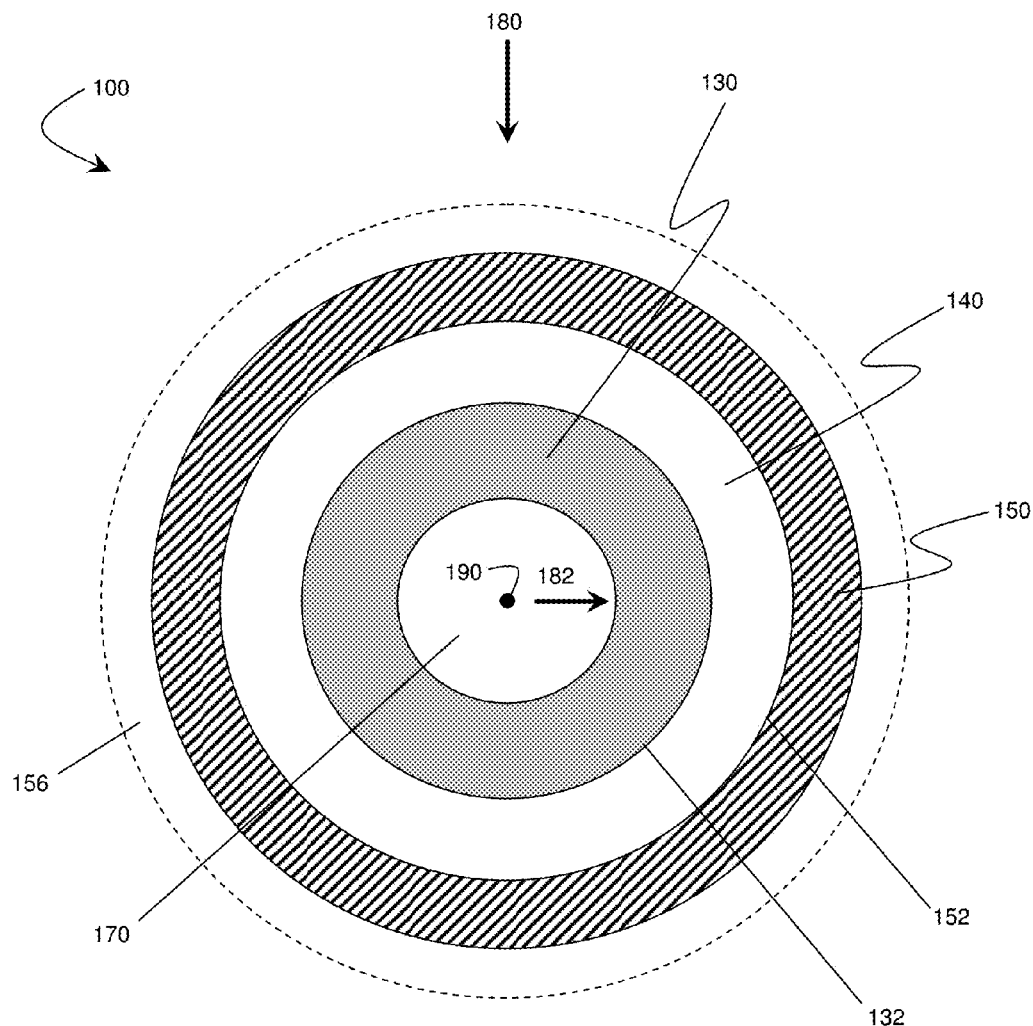
FIG. 2 is a schematic illustration of an electrochemical cell, according to another set of embodiments.

While FIG. 1 illustrates an electrochemical cell arranged in a stacked configuration, it is to be understood that any electrochemical cell arrangement can be constructed, employing the principles of the present invention, in any configuration. For example, FIG. 2 illustrates a cross-sectional view of an electrochemical cell arranged as a cylinder. In the embodiment shown in FIG. 2, cell 100 includes an electrode 130, an electrolyte 140, and electrode 150. In some embodiments, electrode 130 may comprise an anode while electrode 150 may comprise a cathode, while in other embodiments, their order may be reversed. Optionally, the cell may contain a core 170, which may be solid, hollow, or contain a channel or channels. Cell 100 also includes active surfaces 132 and 152. Optionally, the cell may also include, in some embodiments, containment structure 156. As shown in FIG. 2, electrode 130 is formed on core 170, electrolyte 140 is formed on electrode 130, and electrode 150 is formed on electrolyte 140. However, in some embodiments, electrode 130 may be proximate core 170, electrolyte 140 may be proximate electrode 130, and/or electrode 150 may be proximate electrolyte 140, optionally including one or more intervening sections of material between components. In one set of embodiments, electrode 130 may at least partially surround core 170, electrolyte 140 may at least partially surround electrode 130, and/or electrode 150 may at least partially surround electrolyte 140. As used herein, a first entity is "at least partially surrounded" by a second entity if a closed loop can be drawn around the first entity through only the second entity, and does not imply that the first entity is necessarily completely encapsulated by the second entity.

Figure 3:
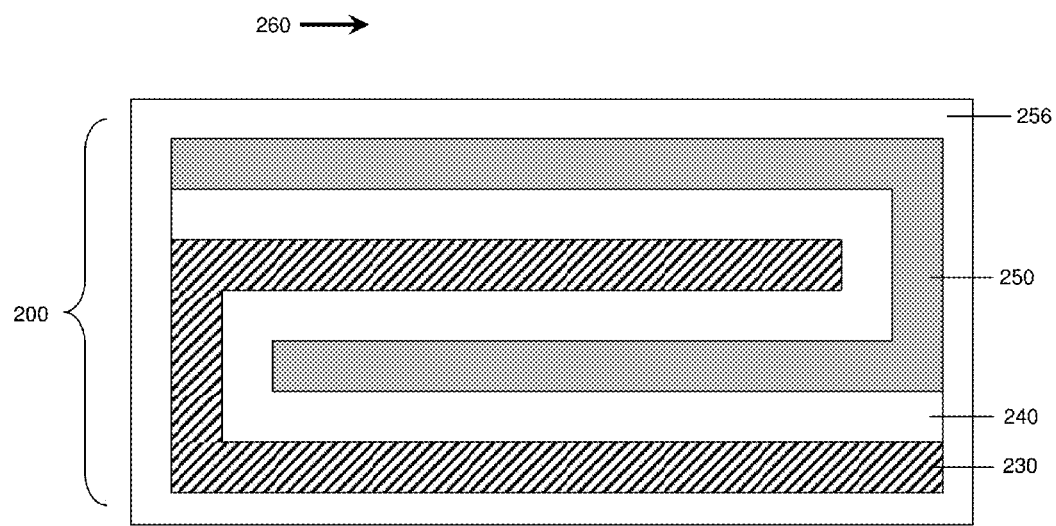
FIG. 3 is a schematic illustration of an exemplary electrochemical cell.

In another set of embodiments, illustrated in FIG. 3, the electrochemical cell is in the shape of a folded stack. The cell 200 illustrated in FIG. 3 comprises electrolyte 240 separating anode 230 and cathode 250. The electrochemical cell in FIG. 3 comprises an electrolyte including three folded planes parallel to arrow 260. In other embodiments, electrochemical cells may comprise electrolytes including any number of folded planes parallel to arrow 260. Optionally, the cell may also include, in some embodiments, containment structure 256. In addition to the shapes illustrated in FIGS. 1-3, the electrochemical cells described herein may be of any other shape including, but not limited to, prisms (e.g., triangular prisms, rectangular prisms, etc.), "Swiss-rolls," non-planar stacks, etc. Additional configurations are described in U.S. patent application Ser. No. 11/400,025, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety.

Electrochemical cells using the electrodes described herein may be capable of achieving enhanced performance. In some embodiments, the electrochemical cell may exhibit high electrode active species utilization. As used herein, "utilization" refers to the extent to which the electrode active material (e.g., sulfur as the cathode active material) within a cell reacts to form desirable reaction products, such that the electrochemical performance (as measured by the discharge capacity) is enhanced. For example, an electrochemical cell is said to utilize 100% of the total sulfur in the cell when all of the sulfur in the cell is completely converted to the desired reaction product (e.g., $S^{2-}$ in the case of sulfur as the active cathode material), thus providing the theoretical discharge capacity of 1672 mAh/g of total sulfur in the cell. It is to be understood that wherever "sulfur" is used as an exemplary electrode active material (e.g., cathode active material), any other electrode active material suitable for use with the invention can be substituted. The theoretical capacity of any electrode active material can be calculated by the following formula:

$$Q = \frac{nF}{3600M}$$

wherein,
  Q=Theoretical capacity, Ah/g (ampere hour per gram)
  n=number of electrons involved in the desired electrochemical reaction,
  F=Faraday constant, 96485 C/equi,
  M=Molecular mass of electrode active material, gram
  3600=Number of seconds in one hour.

Those of ordinary skill in the art would be able to calculate the active material theoretical capacity and compare it to the experimental active material capacity for a particular material to determine whether or not the experimental capacity is at least some percent (e.g., 60%), or greater, of the theoretical capacity. For example, when elemental sulfur (S) is used as the cathode active material and $S^{2-}$ is the desired reaction product, the theoretical capacity is 1672 mAh/g. That is, a cell is said to utilize 100% of the total sulfur in the cell when it produces 1672 mAh/g of total sulfur in the cell, 90% of the total sulfur in the cell when it produces 1504.8 mAh/g of total sulfur in the cell, 60% of the total sulfur in the cell when it produces 1003.2 mAh/g of total sulfur in the cell, and 50% of the total sulfur in the cell when it produces 836 mAh/g of total sulfur in the cell.

In some embodiments, it is possible for the amount of sulfur (or other active material) in the region of the cell that is enclosed by the cathode and anode ("available" sulfur) to be less than that of the total sulfur in the cell. In some cases the electrolyte may be located both in the region enclosed by the anode and cathode and the region not enclosed by the cathode and anode. For example, during charge/discharge cycles under pressure, it is possible for the un-reacted species in the region enclosed by anode and cathode to move out either by diffusion or by the movement of the electrolyte. The utilization expressed based on this "available" electrode active material is the measure of the ability of the cathode structure to facilitate the conversion of the electrode active material in the region enclosed between the cathode and anode to desirable reaction product (e.g., $S^{2-}$ in the case of sulfur as the active cathode material). For example, if all the sulfur available in the region enclosed between the cathode and anode is completely converted to desired reaction product, then the cell will be said to utilize 100% of the available sulfur, and will produce 1672 mAh/g of available sulfur.

In some embodiments, the electrochemical cell can be designed in such a way that either all of the electrolyte is located in between the region enclosed by the anode and cathode or the transport of un-reacted species from the enclosed region to the outside is completely eliminated. For such embodiments, the utilization expressed as mAh/g of available sulfur will be equal to that expressed as mAh/g of total sulfur in the cell.

Electrode active material (e.g., sulfur) utilization may vary with the discharge current applied to the cell, among other things. In some embodiments, electrode active material utilization at low discharge rates may be higher than electrode active material utilization at high discharge rates. In some embodiments, the cell is capable of utilizing at least about 60%, at least about 65%, at least about 70%, at least about 75%, at least about 80%, at least about 85%, at least about 90%, or at least about 92% of the total electrode active material (e.g., sulfur) in the cell over at least one charge and discharge cycle. In some embodiments, the cell is capable of utilizing at least about 60%, at least about 65%, at least about 70%, at least about 75%, at least about 80%, at least about 85%, at least about 90%, or at least about 92% of the available electrode active material (e.g., sulfur) over at least one charge and discharge cycle.

In some cases, the utilization rates of electrochemical cells described herein may remain relatively high through a relatively large number of charge and discharge cycles. As used herein, a "charge and discharge cycle" refers to the process by which a cell is charged from 0% to 100% state of charge (SOC) and discharged from 100% back to 0% SOC. In some embodiments, the electrochemical cell may be capable of utilizing at least about 60%, at least about 65%, at least about 70%, at least about 75%, at least about 80%, at least about 85%, or at least about 90% of the sulfur (e.g., total sulfur in the cell, available sulfur) or other electrode active material through at least a first charge and discharge cycle and at least about 1, 2, 10, 20, 30, 50, 75, 100, 125, or 135 charge and discharge cycles subsequent to the first charge and discharge cycle. In certain embodiments, electrochemical cells of the present invention will cycle at least 1 time, at least 2 times, at least 10 times, at least 20 times, at least 30 times, at least 50 times, at least 75 times, at least 100 times, at least 125 times, or at least 135 times subsequent to a first charge and discharge cycle with each cycle having a sulfur utilization (measured as a fraction of 1672 mAh/g sulfur (e.g., total sulfur in the cell, available sulfur) output during the discharge phase of the cycle) or other electrode active material utilization of at least about 40-50%, at least about 50-60%, at least about 40-60%, at least about 40-80%, at least about 60-70%, at least about 70%, at least about 70-80%, at least about 80%, at least about 80-90%, or at least about 90% when discharged at a moderately high discharge current of at least about 100 mA/g of sulfur (e.g., a discharge current between 100-200 mA/g, between 200-300 mA/g, between 300-400 mA/g, between 400-500 mA/g, or between 100-500 mA/g).

Some of the electrochemical cells described herein may maintain capacity over a relatively large number of charge and discharge cycles. For example, in some cases, the electrochemical cell capacity decreases by less than about 0.2% per charge and discharge cycle over at least about 2, at least about 10, at least about 20, at least about 30, at least about 50, at least about 75, at least about 100, at least about 125, or at least about 135 cycles subsequent to a first charge and discharge cycle.

In some embodiments, the electrochemical cells described herein may exhibit relatively high capacities after repeated cycling of the cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle.

In some embodiments, the electrochemical cells described herein may achieve relatively high charge efficiencies over a large number of cycles. As used herein, the "charge efficiency" of the Nth cycle is calculated as the discharge capacity of the (N+1)th cycle divided by the charge capacity of the Nth cycle (where N is an integer), and is expressed as a percentage. In some cases, electrochemical cells may achieve charge efficiencies of at least about 60%, at least about 70%, at least about 80%, at least about 90%, at least about 95%, at least about 97%, at least about 98%, at least about 99%, at least about 99.5%, or at least about 99.9% for the first cycle. In some embodiments, charge efficiencies of at least about 60%, at least about 70%, at least about 80%, at least about 90%, at least about 97%, at least about 98%, at least about 99%, at least about 99.5%, or at least about 99.9% may be achieved for the 10th, 20th, 30th, 50th, 75th, $100^{th}$, 125th, or 135th cycles subsequent to a first charge and discharge cycle.

The electrochemical cells described herein may be operated using relatively high discharge current densities, in some cases. As used herein, the "discharge current density" refers to the discharge current between the electrodes, divided by the area of the electrode over which the discharge occurs, as measured perpendicular to the direction of the current. For the purposes of discharge current density, the area of the electrode does not include the total exposed surface area of the electrode, but rather, refers to an imaginary plane drawn along the electrode surface perpendicular to the direction of the current. In some embodiments, the electrochemical cells may be operated at a discharge current density of at least about 0.1 mA/cm$^2$, at least about 0.2 mA/cm$^2$, at least about 0.4 mA/cm$^2$ of the cathode surface, or higher. The cells described herein may also be operated, in some cases, at a high discharge current per unit mass of active material. For example, the discharge current may be at least about 100, at least about 200, at least about 300, at least about 400, or at least about 500 mA per gram of active material in an electrode (e.g., sulfur in the cathode), or higher.

Some embodiments may include electrochemical devices in which the application of force is used to enhance the performance of the device. For example, the force may provide improved electrical conductivity between conductive material in an electrode (e.g., carbon in a cathode). In some instances, the application of force to the electrochemical cell may reduce the amount of roughening of one or more surfaces of one or more electrodes which may improve the cycling lifetime and performance of the cell. Any of the electrode properties (e.g., porosities, pore size distributions, etc.) and/or performance metrics outlined above may be achieved, alone or in combination with each other, while an anisotropic force is applied to the electrochemical cell (e.g., during charge and/or discharge of the cell). The magnitude of the anisotropic force may lie within any of the ranges mentioned below.

In some embodiments, the application of force can be used to enhance the performance of the device. In some embodiments, the force comprises an anisotropic force with a component normal to the active surface of the anode. In the case of a planar surface, the force may comprise an anisotropic force with a component normal to the surface at the point at which the force is applied. For example, referring to FIG. 1, a force may be applied in the direction of arrow 60. Arrow 62 illustrates the component of the force that is normal to active surface 52 of anode 50. In the case of a curved surface, for example, a concave surface or a convex surface, the force may comprise an anisotropic force with a component normal to a plane that is tangent to the curved surface at the point at which the force is applied. Referring to the cylindrical cell illustrated in FIG. 2, a force may be applied to an external surface of the cell in the direction of, for example, arrow 180. In some embodiments, the force may be applied from the interior of the cylindrical cell, for example, in the direction of arrow 182. In some embodiments, an anisotropic force with a component normal to the active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over the active surface of the anode. In some embodiments, the anisotropic force is applied uniformly over the active surface of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical cell, but the magnitude of the forces in out-of-plane directions is substantially unequal to the magnitudes of the in-plane forces. For example, referring to FIG. 2, a cylindrical band may be positioned around the exterior of cell 100 such that forces (e.g., force 180) are applied to the cell oriented toward the cell's central axis (indicated by point 190 and extending into and out of the surface of the cross-sectional schematic diagram). In some embodiments, the magnitudes of the forces oriented toward the central axis of the cell are different (e.g., greater than) the magnitudes of the forces applied in out of plane directions (e.g., parallel to central axis 190).

In one set of embodiments, cells of the invention are constructed and arranged to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The magnitude of the applied force is, in some embodiments, large enough to enhance the performance of the electrochemical cell. The anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

Electrode materials or structures and anisotropic forces can be selected together, to achieve results described herein, by those of ordinary skill in the art. For example, where the electrode(s) is relatively soft, the component of the force normal to the active anode surface may be selected to be lower. Where the electrode(s) is harder, the component of the force normal to the active surface may be greater. Those of ordinary skill in the art can easily select electrode materials, alloys, mixtures, etc. with known or predictable properties, or readily test the hardness or softness of such surfaces, and readily select cell construction techniques and arrangements to provide appropriate forces to achieve what is described herein. Simple testing can be done, for example by arranging a series of active materials, each with a series of forces applied normal (or with a component normal) to the active surface, to determine the morphological effect of the force on the surface without cell cycling (for prediction of the selected combination during cell cycling) or with cell cycling with observation of a result relevant to the selection.

In some embodiments, an anisotropic force with a component normal to the active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, define a pressure of at least about 4.9, at least about 9.8, at least about 24.5, at least about 49, at least about 78, at least about 98, at least about 117.6, at least about 147, at least about 175, at least about 200, at least about 225, or at least about 250 Newtons per square centimeter. In some embodiments, the component of the anisotropic force normal to the anode active surface may, for example, define a pressure of less than about 250, less than about 225, less than about 196, less than about 147, less than about 117.6, less than about 98, less than about 49, less than about 24.5, or less than about 9.8 Newtons per square centimeter. In some cases, the component of the anisotropic force normal to the anode active surface is may define a pressure of between about 4.9 and about 147 Newtons per square centimeter, between about 49 and about 117.6 Newtons per square centimeter, between about 68.6 and about 98 Newtons per square centimeter, between about 78 and about 108 Newtons per square centimeter, between about 4.9 and about 250 Newtons per square centimeter, between about 49 and about 250 Newtons per square centimeter, between about 80 and about 250 Newtons per square centimeter, between about 90 and about 250 Newtons per square centimeter, or between about 100 and about 250 Newtons per square centimeter. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force ($kg_f$) is equivalent to about 9.8 Newtons.

In some embodiments, the surface of an electrode layer can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the electrode material layer. For example, for an electrode material comprising lithium, the cell may be under an externally-applied anisotropic force with a component defining a pressure of at least about 8 $kg_f/cm^2$, at least about 9 $kg_f/cm^2$, or at least about 10 $kg_f/cm^2$. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 8 $kg_f/cm^2$, at least about 9 $kg_f/cm^2$, or at least about 10 $kg_f/cm^2$ of externally-applied pressure, the lithium surface may become smoother with cycling when the pressing surface is smooth. As described herein, the pressing surface may be modified by choosing the appropriate material(s) positioned between the anode and the cathode. For instance, in some cases the smoothness of the lithium surface (or surface of other active electrode materials) can be increased, during application of pressure, by the use of an electrically non-conductive material layer as described herein.

In some cases, one or more forces applied to the cell have a component that is not normal to an active surface of an anode. For example, in FIG. 1, force 60 is not normal to anode active surface 52, and force 60 includes component 64, which is substantially parallel to anode active surface 52. In addition, a force 66, which is substantially parallel to anode active surface 52, could be applied to the cell in some cases. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the anode active surface.

In some embodiments, the cathode and anode have yield stresses, wherein the effective yield stress of one of the cathode and anode is greater than the yield stress of the other, such that an anisotropic force applied normal to the surface of one of the active surface of the anode and the active surface of the cathode causes the surface morphology of one of the cathode and the anode to be affected. In some embodiments, the component of the anisotropic force normal to the active anode surface is between about 20% and about 200% of the yield stress of the anode material, between about 50% and about 120% of the yield stress of the anode material, between about 80% and about 120% of the yield stress of the anode material, between about 80% and about 100% of the yield stress of the anode material, between about 100% and about 300% of the yield stress of the anode material, between about 100% and about 200% of the yield stress of the anode material, or between about 100% and about 120% of the yield stress of the anode material.

The anisotropic force described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Provisional Application No. 61/086,329, filed Aug. 5, 2008, entitled "Application of Force in Electrochemical Cells" to Scordilis-Kelley et al., and U.S. patent application Ser. No. 12/535,328, filed Aug. 4, 2009, entitled "Application of Force in Electrochemical Cells" to Scordilis-Kelley et al. which are incorporated herein by reference in their entirety.

In some embodiments, the application of a force as described herein may allow for the use of smaller amounts of anode active material (e.g., lithium) and/or electrolyte within an electrochemical cell, relative to the amounts used in essentially identical cells in which the force is not applied. In cells lacking the applied force described herein, active anode material (e.g., lithium metal) may be, in some cases, redeposited unevenly on an anode during charge-discharge cycles of the cell, forming a rough surface. In some cases, this may lead to an increase in the rates of one or more undesired reactions involving the anode metal. These undesired reactions may, after a number of charge-discharge cycles, stabilize and/or begin to self-inhibit such that substantially no additional active anode material becomes depleted and the cell may function with the remaining active materials. For cells lacking the applied force as described herein, this "stabilization" is often reached only after a substantial amount of anode active material has been consumed and cell performance has deteriorated. Therefore, in some cases where forces as described herein have not been applied, a relatively large amount of anode active material and/or electrolyte has often been incorporated within cells to accommodate for loss of material during consumption of active materials, in order to preserve cell performance.

Accordingly, the application of force as described herein may reduce and/or prevent depletion of active materials such that the inclusion of large amounts of anode active material and/or electrolyte within the electrochemical cell may not be necessary. For example, the force may be applied to a cell prior to use of the cell, or in an early stage in the lifetime of the cell (e.g., less than five charge-discharge cycles), such that little or substantially no depletion of active material may occur upon charging or discharging of the cell. By reducing and/or eliminating the need to accommodate for active material loss during charge-discharge of the cell, relatively small amounts of anode active material may be used to fabricate cells and devices as described herein. In some embodiments, the invention relates to devices comprising an electrochemical cell having been charged and discharged less than five times in its lifetime, wherein the cell comprises an anode, a cathode, and an electrolyte, wherein the anode comprises no more than five times the amount of anode active material which can be ionized during one full discharge cycle of the cell. In some cases, the anode comprises no more than four, three, two, or 1.5 times the amount of lithium which can be ionized during one full discharge cycle of the cell.

In some cases, the devices described herein can comprise an electrochemical cell, wherein the cell comprises an anode active material, a cathode active material, and an electrolyte, wherein the ratio of the amount of anode active material in the anode to the amount of cathode active material in the cathode is less than about 5:1, less than about 3:1, less than about 2:1, or less than about 1.5:1 on a molar basis. For example, a cell may comprise lithium as an active anode material and sulfur as an active cathode material, wherein the molar ratio Li:S is less than about 5:1. In some cases, the molar ratio of lithium to sulfur, Li:S, is less than about 3:1, less than about 2:1, or less than about 1.5:1. In some embodiments, the ratio of anode active material (e.g., lithium) to cathode active material by weight may be less than about 2:1, less than about 1.5:1, less than about 1.25:1, or less than about 1.1:1. For example, a cell may comprise lithium as the active anode material and sulfur as the active cathode material, wherein the ratio Li:S by weight is less than about 2:1, less than about 1.5:1, less than about 1.25:1, or less than about 1.1:1.

The use of smaller amounts of active anode material and/or electrolyte material may advantageously allow for electrochemical cells, or portions thereof, having decreased thickness. In some embodiments, the anode layer and the electrolyte layer together have a maximum thickness of about 500 microns. In some cases, the anode layer and the electrolyte layer together have a maximum thickness of about 400 microns, about 300 microns, about 200 microns, about 100 microns, about 50 microns, or, in some cases, about 20 microns.

The anodes described herein may include a variety of electroactive materials. Suitable electroactive materials for use as anode active materials in the anode of the electrochemical cells described herein include, but are not limited to, lithium metal such as lithium foil and lithium deposited onto a conductive substrate, and lithium alloys (e.g., lithium-aluminum alloys and lithium-tin alloys). While these are preferred negative electrode materials, the current collectors may also be used with other cell chemistries. In some embodiments, the anode may comprise one or more binder materials (e.g., polymers, etc.).

In some embodiments, an electroactive lithium-containing material of an anode active layer comprises greater than 50 wt % lithium. In some cases, the electroactive lithium-containing material of an anode active layer comprises greater than 75 wt % lithium. In still other embodiments, the electroactive lithium-containing material of an anode active layer comprises greater than 90 wt % lithium.

Positive and/or negative electrodes may optionally include one or more layers that interact favorably with a suitable electrolyte, such as those described in U.S. patent application Ser. No. 12/312,764, filed May 26, 2009 and entitled "Separation of Electrolytes," by Mikhaylik et al., which is incorporated herein by reference in its entirety.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, the electrolyte comprises a fluid that can be added at any point in the fabrication process. In some cases, the electrochemical cell may be fabricated by providing a cathode and an anode, applying an anisotropic force component normal to the active surface of the anode, and subsequently adding the fluid electrolyte such that the electrolyte is in electrochemical communication with the cathode and the anode. In other cases, the fluid electrolyte may be added to the electrochemical cell prior to or simultaneously with the application of the anisotropic force component, after which the electrolyte is in electrochemical communication with the cathode and the anode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes, for example, in lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network.

Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic polysulfides (LiS$_x$R)$_n$, where x is an integer from 1 to 20, n is an integer from 1 to 3, and R is an organic group, and those disclosed in U.S. Pat. No. 5,538,812 to Lee et al.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

The following documents are incorporated herein by reference in their entireties for all purposes: U.S. Provisional Patent Application No. 61/237,903, filed Aug. 28, 2009, and entitled "Electrochemical Cells Comprising Porous Structures Comprising Sulfur;" U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, entitled "Rechargeable Lithium/Water, Lithium/Air Batteries"; International Patent Apl. Serial No.: PCT/US2008/009158, filed Jul. 29, 2008, entitled "Swelling Inhibition in Lithium Batteries"; U.S. patent application Ser. No. 12/312,764, filed May 26, 2009, entitled "Separation of Electrolytes"; International Patent Apl. Serial No.: PCT/US2008/012042, filed Oct. 23, 2008, entitled "Primer for Battery Electrode"; U.S. patent application Ser. No. 12/069,335, filed Feb. 8, 2008, entitled "Protective Circuit for Energy-Storage Device"; U.S. patent application Ser. No. 11/400,025, filed Apr. 6, 2006, entitled "Electrode Protection in both Aqueous and Non-Aqueous Electrochemical Cells, including Rechargeable Lithium Batteries"; U.S. patent application Ser. No. 11/821,576, filed Jun. 22, 2007, entitled "Lithium Alloy/Sulfur Batteries"; patent application Ser. No. 11/111,262, filed Apr. 20, 2005, entitled "Lithium Sulfur Rechargeable Battery Fuel Gauge Systems and Methods"; U.S. patent application Ser. No. 11/728,197, filed Mar. 23, 2007, entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, entitled "Electrolyte Additives for Lithium Batteries and Related Methods"; International Patent Apl. Serial No.: PCT/US2009/000090, filed Jan. 8, 2009, entitled "Porous Electrodes and Associated Methods"; U.S. patent application Ser. No. 12/535,328, filed Aug. 4, 2009, entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, and published on Mar. 24, 2011, as U.S. Patent Publication No. 2011/0068001, entitled "Release System for Electrochemical cells (which claims priority to Provisional Patent Apl. Ser. No. 61/236,322, filed Aug. 24, 2009, entitled "Release System for Electrochemical Cells"); a U.S. Provisional Application, filed on Aug. 24, 2010, entitled "Separator for Electrochemical Cell;" U.S. patent application Ser. No. 12/862,528, filed on Aug. 24, 2010, and published on Jul. 21, 2011 as U.S. Patent Publication No. 2011/0177398, entitled "Electrochemical Cell;" U.S. patent application Ser. No. 12/862,581, filed on Aug. 24, 2010, and published on Mar. 31, 2011, as U.S. Patent Publication No. 2011/0076560, entitled "Electrochemical Cells Comprising Porous Structures Comprising Sulfur;" U.S. patent application Ser. No. 12/862,563, filed on Aug. 24, 2010, and published on Mar. 24, 2011, as U.S. Patent Publication No. 2011/0070494, entitled "Electrochemical Cells Comprising Porous Structures Comprising Sulfur;" and U.S. patent application Ser. No. 12/862,551, filed on Aug. 24, 2010, and published on Mar. 24, 2011, as U.S. Patent Publication No. 2011/0070491, entitled "Electrochemical Cells Comprising Porous Structures Comprising Sulfur."

The following examples are intended to illustrate certain embodiments of the present invention, but do not exemplify the full scope of the invention.

EXAMPLE 1

This example describes the fabrication and testing of a cathode comprising a porous support structure in which particles comprising sulfur were deposited. 100 grams of elemental sulfur (available from Aldrich Chemical Company, Milwaukee, Wis.), were dissolved in 1200 mL of toluene (Aldrich) at 103° C. in a round bottom flask fitted with a condenser. 100 grams of Printex® XE-2 (a carbon pigment available from Degussa Corporation, Akron, Ohio) conductive carbon (surface area 800-1000 $m^2$/g, absorption stiffness 350-410 mL dibutyl phthalate (DBP)/100 g XE-2), was added to the solution. The solution was quickly absorbed by the carbon. After a couple of hours of stirring, the mixture was cooled to room temperature, where sulfur has lower solubility in toluene (84 mM). After cooling, the sulfur crystallized in the carbon pores, and the excess toluene was filtered off.

Figure 4A:
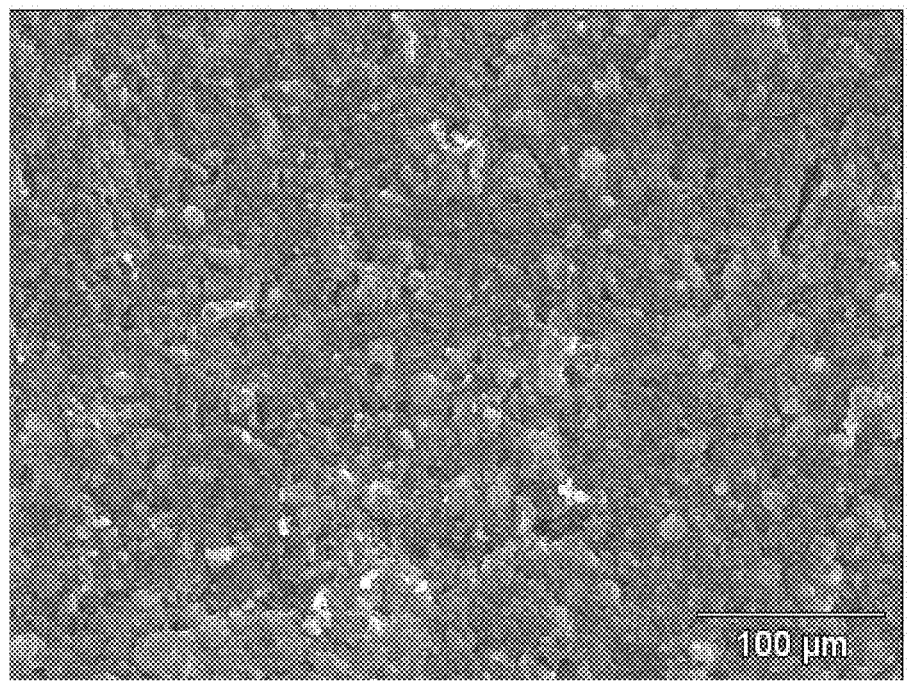
FIGS. 4A-4B include scanning electron micrographs (SEMs) of exemplary electrodes.

The sulfur-filled carbon material was dried and mixed with appropriate amounts of polyvinyl alcohol binder (Celvol 425 from Celanese Corporation) dissolved in a 1:1 weight ratio mixture of isopropanol and water. The cathode slurry was coated onto a conductive carbon coated Aluminum foil substrate (7-μm-thick from All Foils). After drying, the coated cathode active layer thickness was about 110 microns. The resultant cathode was easy to coat, included a homogeneous distribution of small particle size sulfur, and had uniform porosity, as shown in FIG. 4A.

Figure 5A:
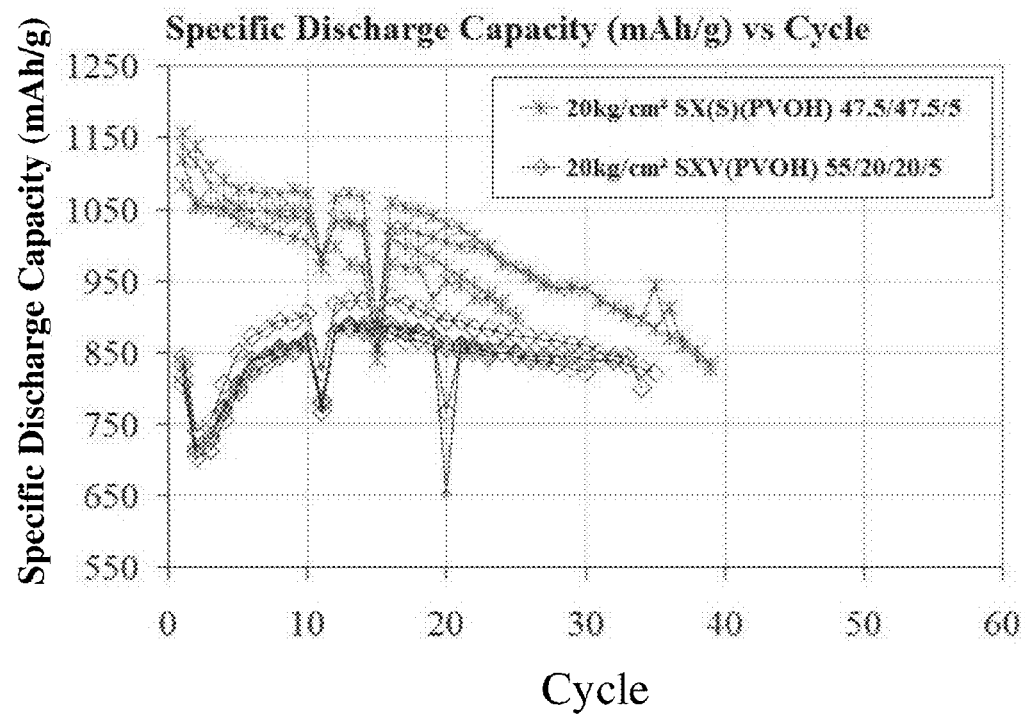
FIGS. 5A-5B include (A) a plot of specific discharge capacity as a function of the number of charge-discharge cycles and (B) a plot of capacity as a function of C-rate, according to one set of embodiments.
Figure 5B:
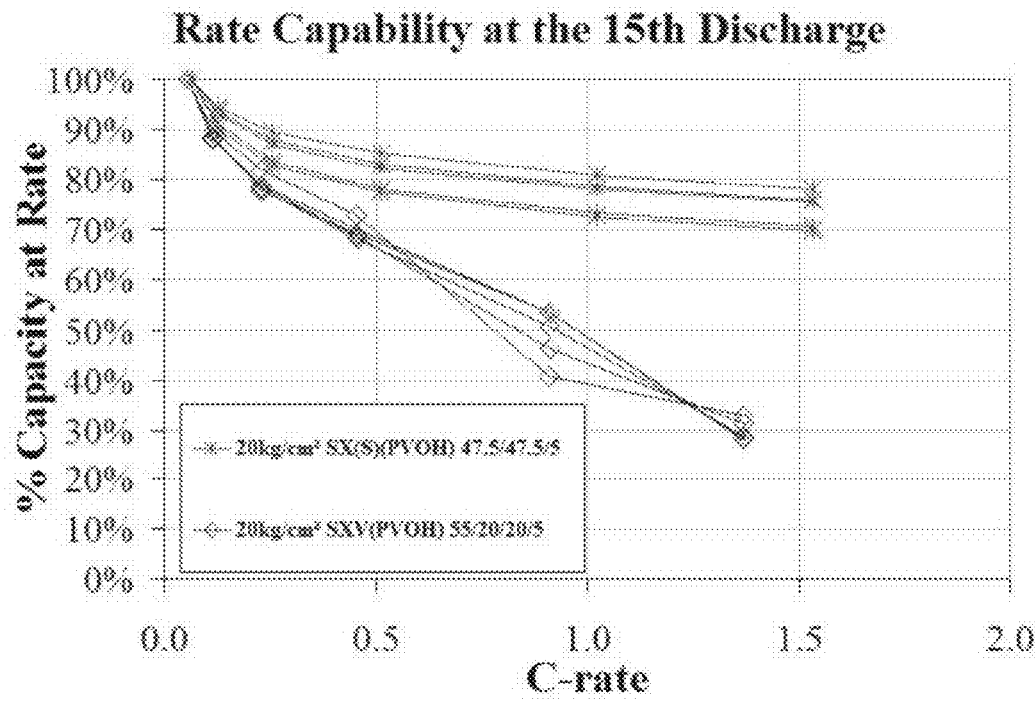

An electrochemical cell including the cathode was assembled for testing. Lithium metal (>99.9% Li, 2 mil thick foil from Chemetall-Foote Corp., Kings Mountain, N.C.) was used for the anode. The electrolyte included 8 parts of lithium bis(trifluoromethane sulfonyl)imide, (lithium imide available from 3M Corporation, St. Paul, Minn.), 3.8 parts lithium nitrate (available from Aldrich Chemical Company, Milwaukee, Wis.), 1 part guanidine nitrate (also available from Aldrich Chemical Company, Milwaukee, Wis.) and 0.4 parts pyridine nitrate (synthesized in-house from pyridine and nitric acid) in a 1:1 weight ratio mixture of 1,3-dioxolane and dimethoxyethane. The electrolyte included a water content of less than 50 ppm. A porous separator comprising 9-μm SETELA (a polyolefin separator available from Tonen Chemical Corporation, Tokyo, Japan, and from Mobil Chemical Company, Films Division, Pittsford, N.Y.) was included between the anode and the cathode. The anode, cathode, separator, and electrolyte were stacked into a layered structure of 6×(cathode/separator/anode), which was compressed between two parallel plates at a pressure of 196 Newtons/$cm^2$ (about 20 kg-force/$cm^2$). The liquid electrolyte filled the void areas of the separator and cathode to form prismatic cells with an electrode area of about 100 $cm^2$. After sealing, the cells were stored for 24 hours. Charge-discharge cycling was performed at 40 mA and 25 mA, respectively. The discharge cutoff voltage was 1.7V and the charge cutoff voltage was 2.5V. FIG. 5A includes a plot of specific discharge capacity for the composite electrodes (indicated with asterisks) as a function of the number of cycles. FIG. 5B includes a plot of the capacity of the cells (indicated with asterisks), expressed as a percentage relative to the initial maximum, as a function of C-rate. The specific discharge capacities remained relatively high over multiple cycles. In addition, the cells maintained relatively high capacities at relatively high C-rates.

COMPARATIVE EXAMPLE 1

Figure 4B:
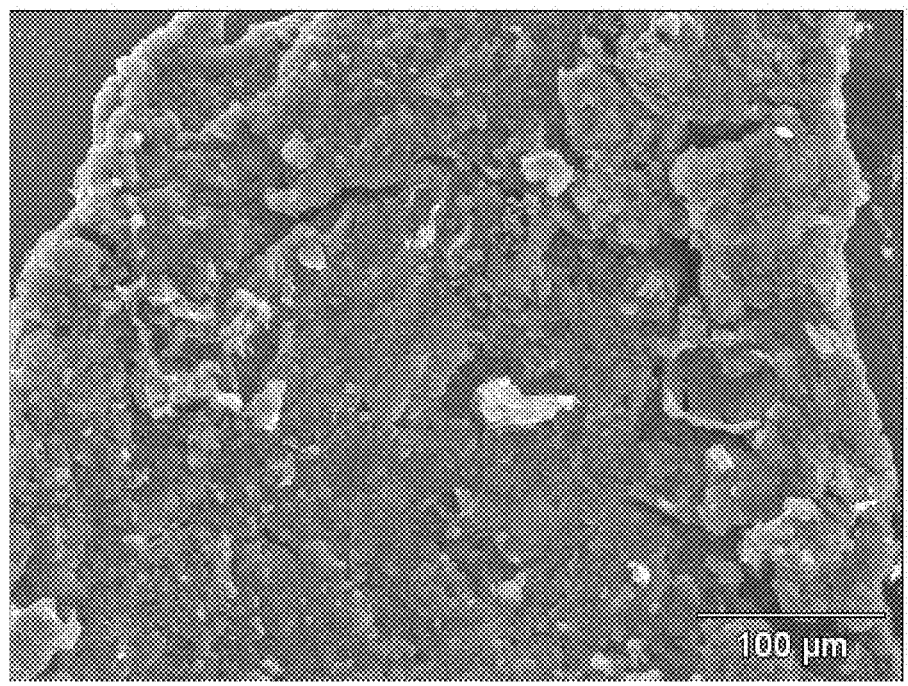

This example describes the fabrication and testing of a cathode comprising a mechanical mixture of sulfur and carbon. The first attempt included a 1:1 carbon-to-sulfur ratio in the mixture. However, the 1:1 mixture could not be effectively deposited on the coater. In subsequent experiments, the cathode was prepared by preparing a mixture comprising 55 parts of elemental sulfur (Aldrich Chemical Company, Milwaukee, Wis.), 40 parts of a conductive carbon pigment Printex® XE-2, and 5 parts of polyvinyl alcohol binder. The mixture was dissolved in a 1:1 weight ratio mixture of isopropanol and water. The solution was coated onto a 7-micron-thick conductive carbon coated Aluminum foil substrate. After drying, the coated cathode active layer thickness was about 90 microns. The resultant cathode was very heterogeneous with large Sulfur particles and carbon agglomerates, as shown in FIG. 4B.

An electrochemical cell including the cathode was assembled for testing according to the process described in Example 1. FIG. 5A includes a plot of specific discharge capacity of cells comprising mechanically mixed cathodes (indicated with diamonds) as a function of the number of cycles. FIG. 5B includes a plot of the capacity of cells comprising mechanically mixed cathodes (indicated with diamonds), expressed as a percentage relative to the initial maximum, as a function of C-rate. The specific discharge capacities for cells comprising the mechanically mixed cathodes were relatively low over the number of tested cycles. In addition, the cells comprising mechanically mixed cathodes exhibited much larger decreases in capacity at higher C-rates.

EXAMPLE 2

This example describes the use of a thermal processing scheme to deposit sulfur in porous support materials comprising conductive carbons. The following conductive carbons were tested: Printex® XE-2, Vulcan XC72R (Cabot Corporation, Tampa, Tex.) and SAB (Shawinigan Acetylene Black, formerly available from Chevron Phillips, The Woodlands, Tex.). The conductive carbons were heated in an evacuated round bottom flask at 300-450° C. for 5 to 6 hours prior to mixing with sulfur. Sulfur powder (Alfa Aesar Corporation, Ward Hill, Mass.) and conductive carbon were mixed together under an inert Ar atmosphere.

The mixture was heated past the meting point of sulfur to 160° C. under vacuum for 5 to 6 hours to produce a yellow, low viscosity fluid comprising $S_8$. Heating the mixture beyond the melting point of sulfur resulted in depositing liquid sulfur in the pores of the carbon particles without the use of solvents. The temperature was then raised to 250 to 300° C. under reduced pressure for 4 to 6 hours to perform polymerization of adsorbed sulfur. In addition, the heating helped in producing a uniform surface distribution. After the polymerization step, the composites were rapidly cooled to form composites comprising polymeric sulfur and carbon.

Figure 6A:
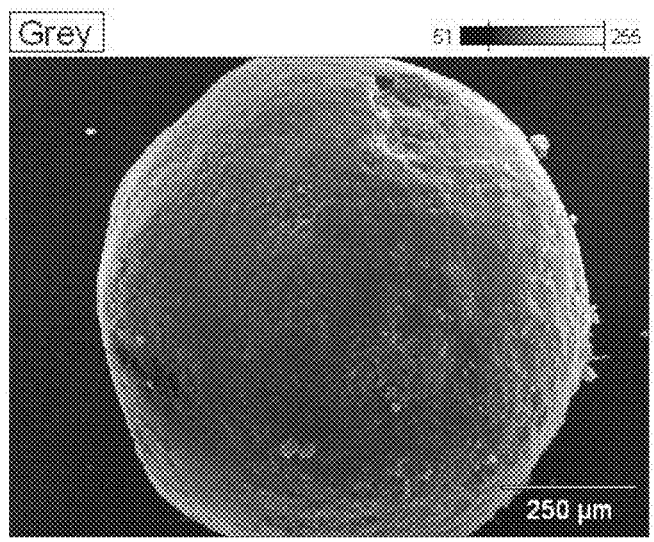
FIGS. 6A-6F include (A) a secondary electron image of a sulfur-carbon composite, (B-C) X-ray spectral images of the composite in FIG. 6A, (D) a secondary electron image of a cross-section of a sulfur-carbon composite, and (E-F) X-ray spectral images of the composite in FIG. 6D, according to one set of embodiments.
Figure 6B:
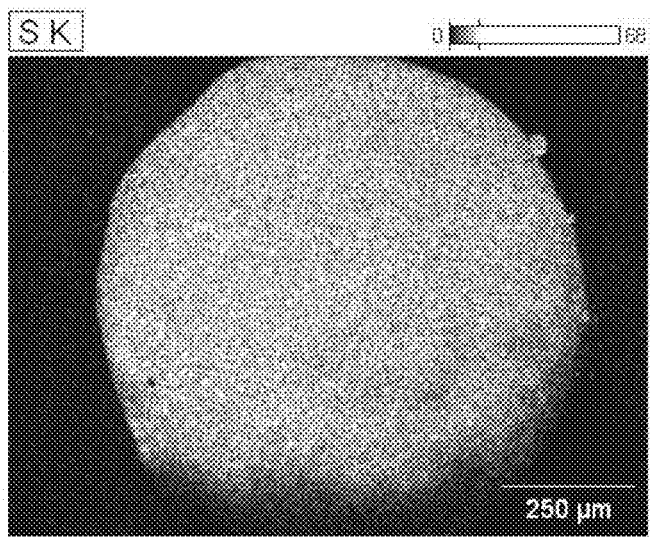
Figure 6C:
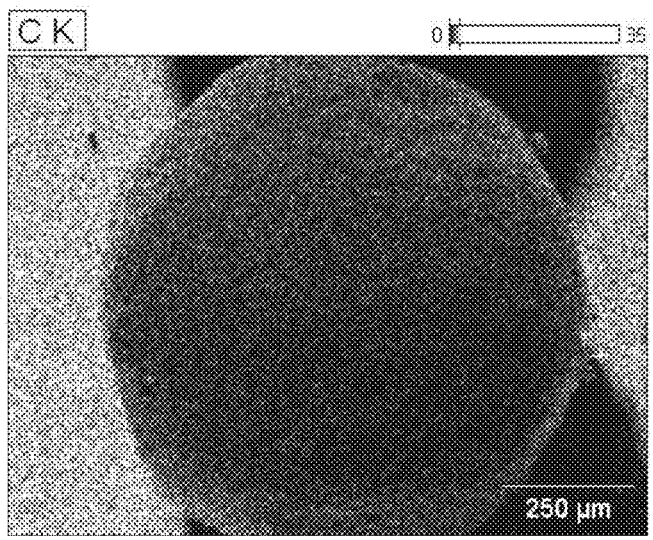
Figure 6D:
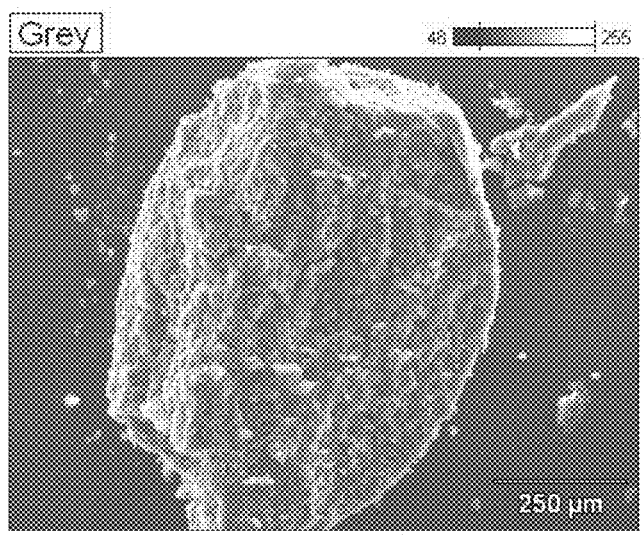
Figure 6E:
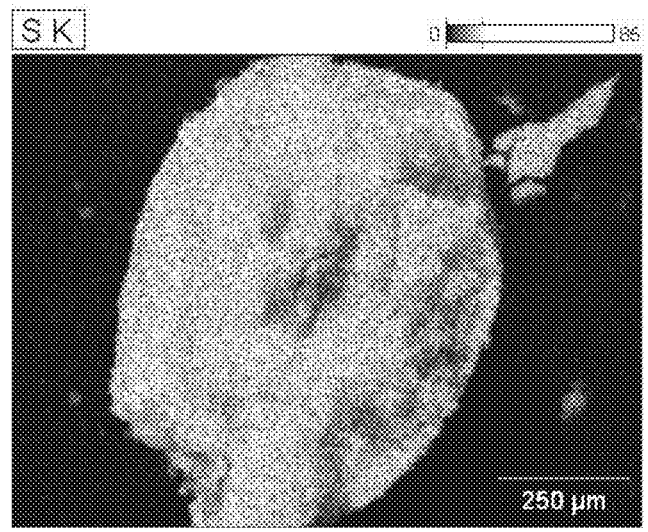
Figure 6F:
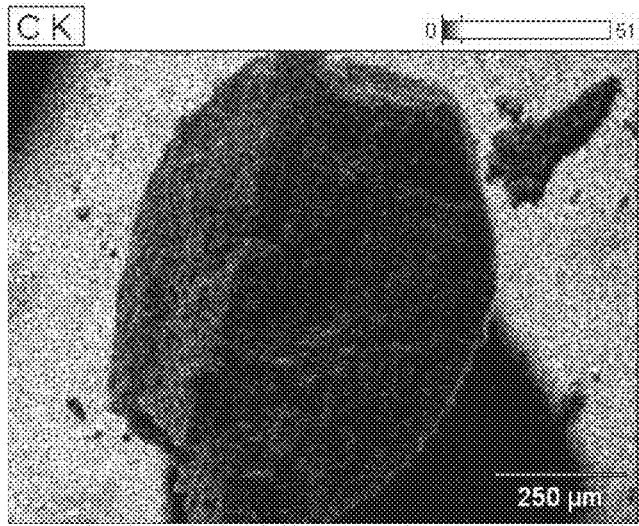

Sulfur-filled carbon composites were fabricated with S:C ratios varying from 6:1 to 1:1, depending on the available pore volume and surface area of the carbon were fabricated using various types of carbon. FIG. 6A includes a secondary electron image of the external surface of a sulfur-carbon composite particle. FIGS. 6B-6C include X-ray spectral images outlining the distributions of (B) sulfur and (C) carbon on the external surface of the composite particle shown in FIG. 6A. The images in FIGS. 6B-6C indicate that the sulfur and carbon were evenly distributed across the outside surface of the composite particle. FIG. 6D includes a secondary electron image of an internal surface of a sulfur-carbon composite particle. FIGS. 6E-6F include X-ray spectral images outlining the distributions of (E) sulfur and (F) carbon on the internal surface of the composite particle shown in FIG. 6D. The images in FIGS. 6E-6F indicate that the sulfur and carbon were evenly distributed across the internal surface of the composite particle.

The sulfur-carbon composites were mixed with appropriate amounts of polyvinyl alcohol binder or Gelatin B (Sigma-Aldrich Chemical Company, Milwaukee, Wis.) and dissolved in a 1:1 weight ratio mixture of iso-propanol and water. The cathode slurry was coated onto a conductive, carbon-coated Aluminum foil substrate (7 microns thick) in a similar fashion as described in Example 1.

The resultant composite cathode materials had a relatively high density, uniform porosity, and homogeneous sulfur distribution. The sulfur-carbon composites contained extended, clean sulfur-carbon interfaces that could be useful in promoting structure and conductivity. In addition, this process produced little to no waste, and mechanical milling was not required. In addition, the carbons and composites could be easily modified by various gas or vapor treatments during thermo-vacuum activation at any processing stage, providing for a flexible means of functionalization (e.g., via metals, oxide powders, sulfide powders, nanotubes, polymer macromolecules, etc.). The composite cathodes were also relatively easy to coat, and were relatively stable and compositionally uniform during cycling.

Electrochemical cells including the cathodes were assembled for testing. Lithium metal (>99.9% Li, 2 mil thick foil) was used as the anode. The electrolyte included 8 parts of lithium bis(trifluoromethane sulfonyl)imide, 3.8 parts lithium nitrate, 1 part guanidine nitrate, and 0.4 parts pyridine nitrate (synthesized in-house from pyridine and nitric acid) in a 1:1 weight ratio mixture of 1,3-dioxolane and dimethoxyethane. The electrolyte included a water content of less than 50 ppm. A 9-micron SETELA porous separator was also used.

Figure 7:
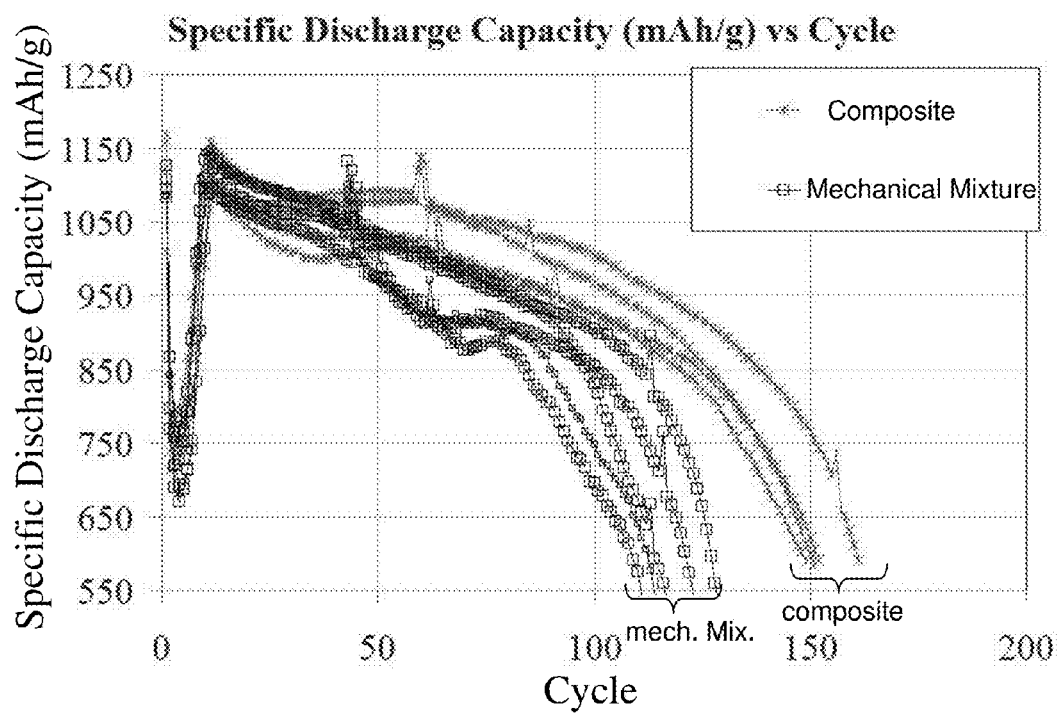
FIG. 7 includes a plot of specific discharge capacity as a function of the number of charge-discharge cycles, according to one set of embodiments.

The above components were assembled into a layered structure of cathode/separator/anode, which was folded in half to make a bicell. The bicell was placed in a foil pouch with approximately 0.4 grams of a liquid electrolyte. After storing for 24 hours, the cells were tested without compression. FIG. 7 includes a plot of specific discharge capacity of cells comprising the composite cathodes (indicated with asterisks) as a function of the number of cycles. The cells comprising the composite cathodes exhibited relatively high discharge capacities relative to cells comprising mechanically mixed cathodes.

COMPARATIVE EXAMPLE 2

This example describes the fabrication and testing of a cathode comprising a mechanical mixture of sulfur and carbon in a 1:1 ratio. As was observed in Comparative Example 1, a 1:1 carbon-to-sulfur formulation was extremely difficult to produce on the coater. In this example, hand drawn-down coatings were fabricated. The electrodes fabricated by this process exhibited dispersities more than two orders of magnitude lower compared to those observed in the composite structures described in Example 2. In addition, the hand drawn-down coatings were more difficult to coat and exhibited relatively high compositional instabilities during cycling, relative to the composites described in Example 2.

Figure 8A:
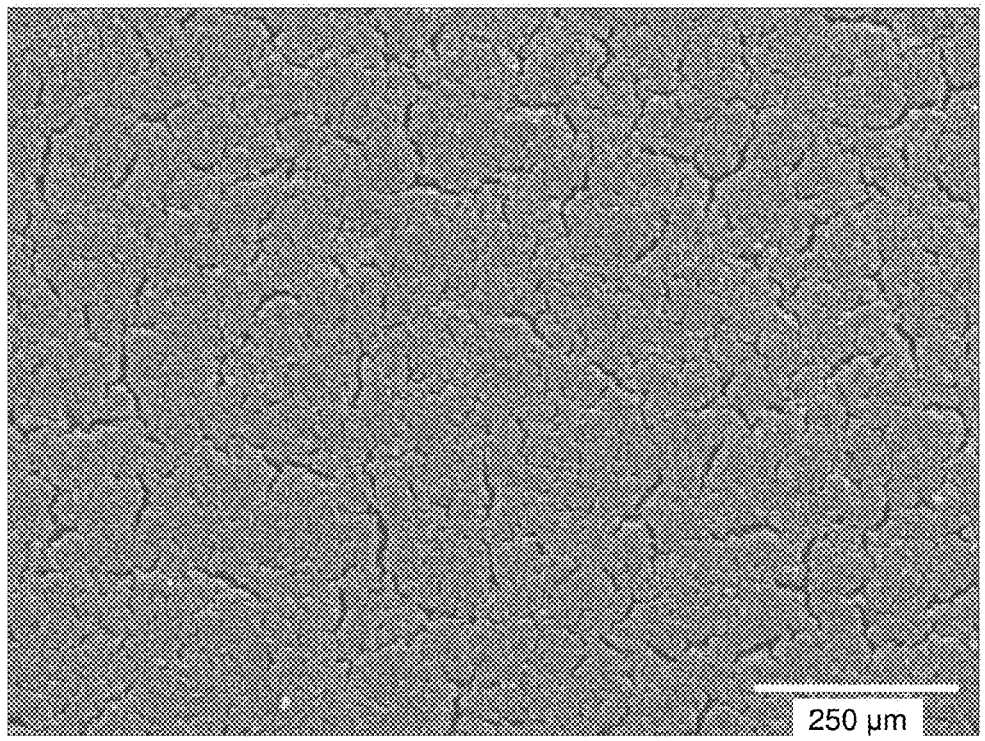
FIGS. 8A-8B include secondary electron images of electrodes, according to one set of embodiments.
Figure 8B:
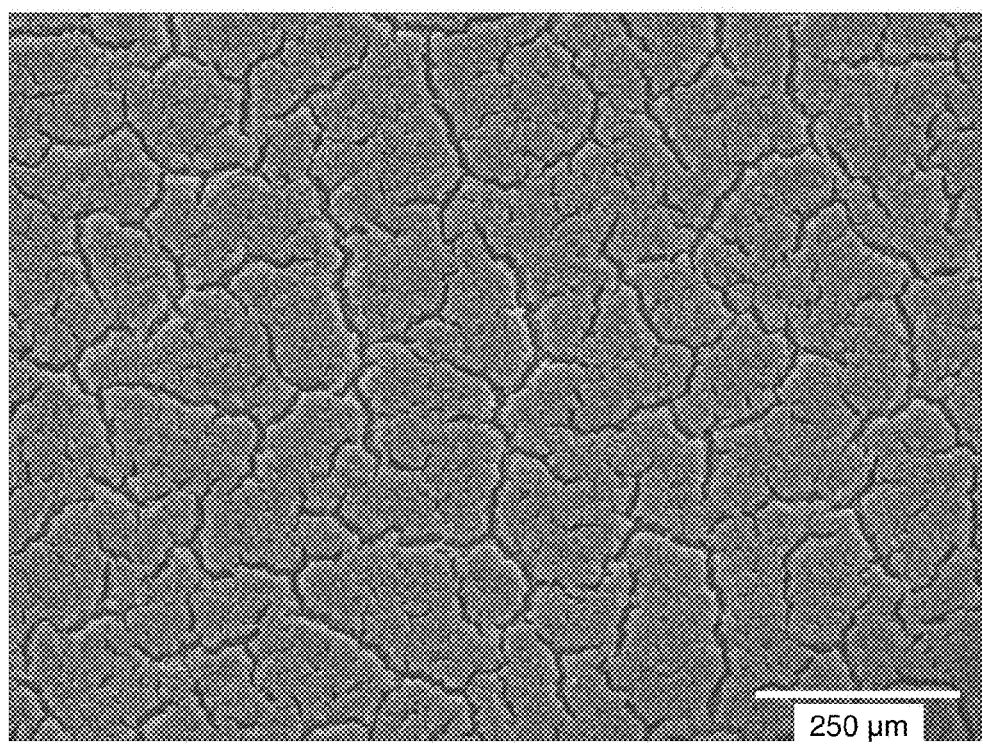
Figure 9A:
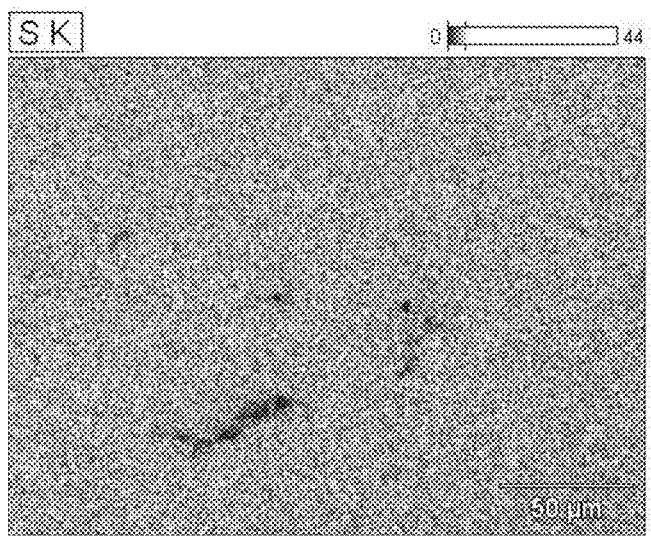
FIGS. 9A-9F include X-ray spectral images outlining the distributions of (A) sulfur in a composite cathode, (B) carbon in a composite cathode, (C) aluminum in a composite cathode, (D) sulfur in a mechanically mixed cathode, (E) carbon in a mechanically mixed cathode, and (F) aluminum in a mechanically mixed cathode, according to one set of embodiments.
Figure 9B:
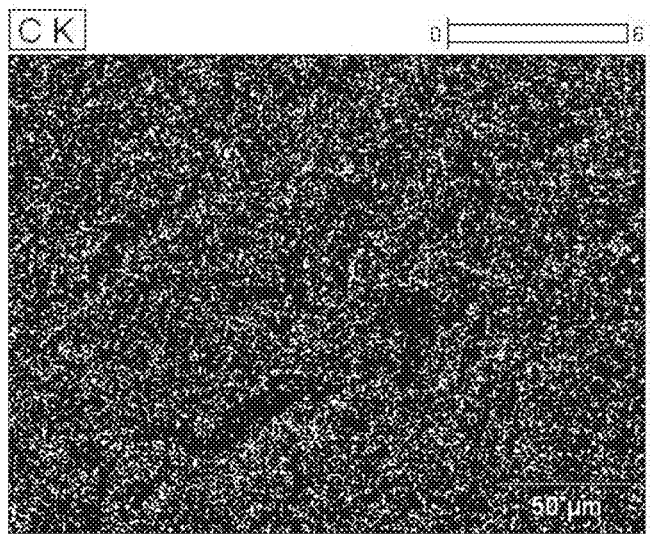
Figure 9C:
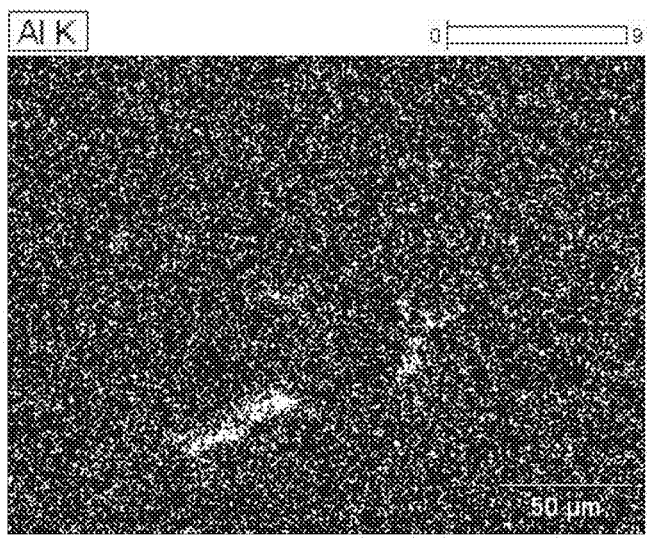
Figure 9D:
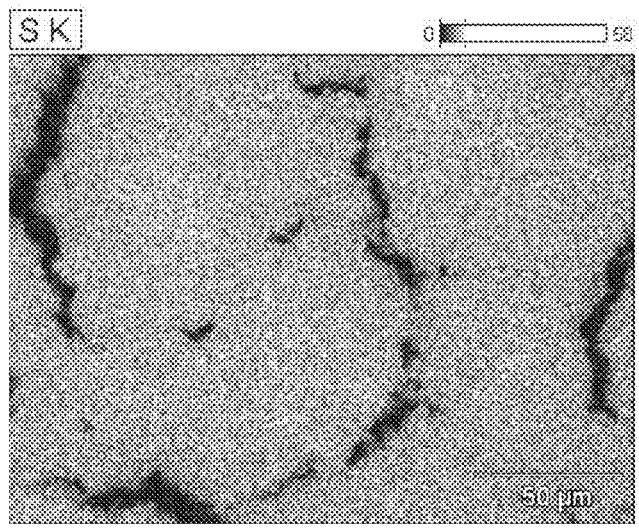
Figure 9E:
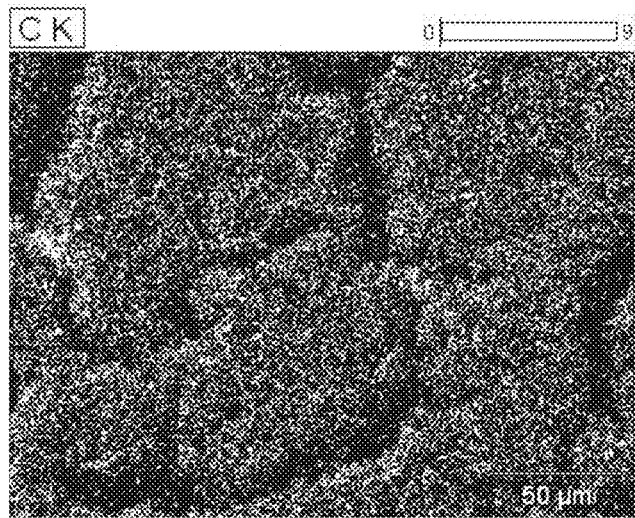
Figure 9F:
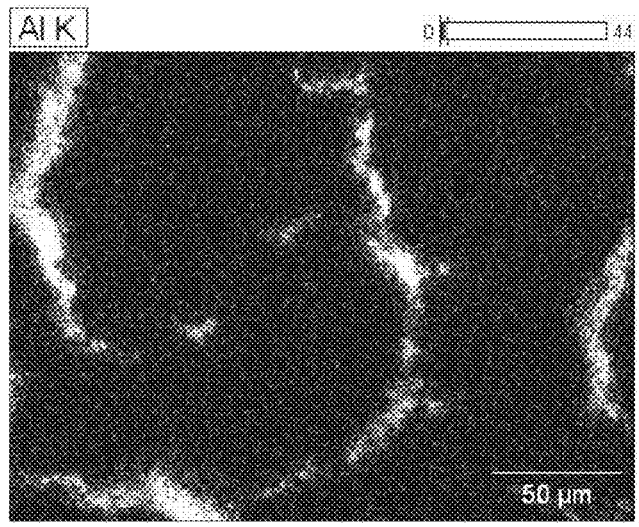

FIGS. 8A and 8B include secondary electron images of a pristine composite cathode (as described in Example 2) and a mechanically mixed cathode, respectively, each comprising a S:XE2 ratio of 84:16. FIGS. 9A-9C include X-ray spectral images outlining the distributions of (A) sulfur, (B) carbon, and (C) aluminum in the composite cathode (Example 2). In addition, FIGS. 9D-9F include X-ray spectral images outlining the distributions of (D) sulfur, (E) carbon, and (F) aluminum in the mechanically mixed cathode. The composite cathode includes a relatively uniform distribution of all three elements, compared to the mechanically mixed cathode. In addition, the domain structure in the composite cathode described in Example 2 was not developed. The thicknesses of the cracks in the composite cathode were two times smaller than those in the mechanically mixed cathode, and the crack density of the composite cathode was significantly lower than that observed in the mechanically mixed cathode.

An electrochemical cell including the mechanically mixed cathode was assembled for testing according to the process described in Example 2. FIG. 7 includes a plot of specific discharge capacity of cells comprising the mechanically mixed cathodes (indicated with squares) as a function of the number of cycles. The cells comprising the mechanically mixed cathodes exhibited relatively low discharge capacities relative to cells comprising composite cathodes.

EXAMPLE 3

This example describes the fabrication and testing of a cathode fabricated using a nickel foam. The cathode was prepared by filling the pores of a nickel foam (Incofoam supplied by Novamet, 450 micron pores, density of 320 g/cm$^2$) with a mixture of 75 parts of elemental sulfur, 20 parts of Printex® XE-2, 4 parts of graphite powder (Aldrich Chemical Company, Milwaukee, Wis.), and 1 part of polyvinyl alcohol (Celvol 425 from Celanese Corporation) dissolved in a 1:1 weight ratio mixture of isopropanol and water. Upon adding the mixture, pores of less than 10 microns in diameter were formed within the pores of the nickel foam, in which the sulfur was deposited.

An electrochemical cell including the cathode was assembled for testing. Lithium metal (>99.9% Li, 2 mil thick foil) was used as the anode. The electrolyte included 14 parts of lithium bis(trifluoromethane sulfonyl)imide and 4 parts lithium nitrate in a 1:1 weight ratio mixture of 1,3-dioxolane and dimethoxyethane. The electrolyte included a water content of less than 50 ppm. A 9-micron SETELA porous separator was also used.

Figure 10:
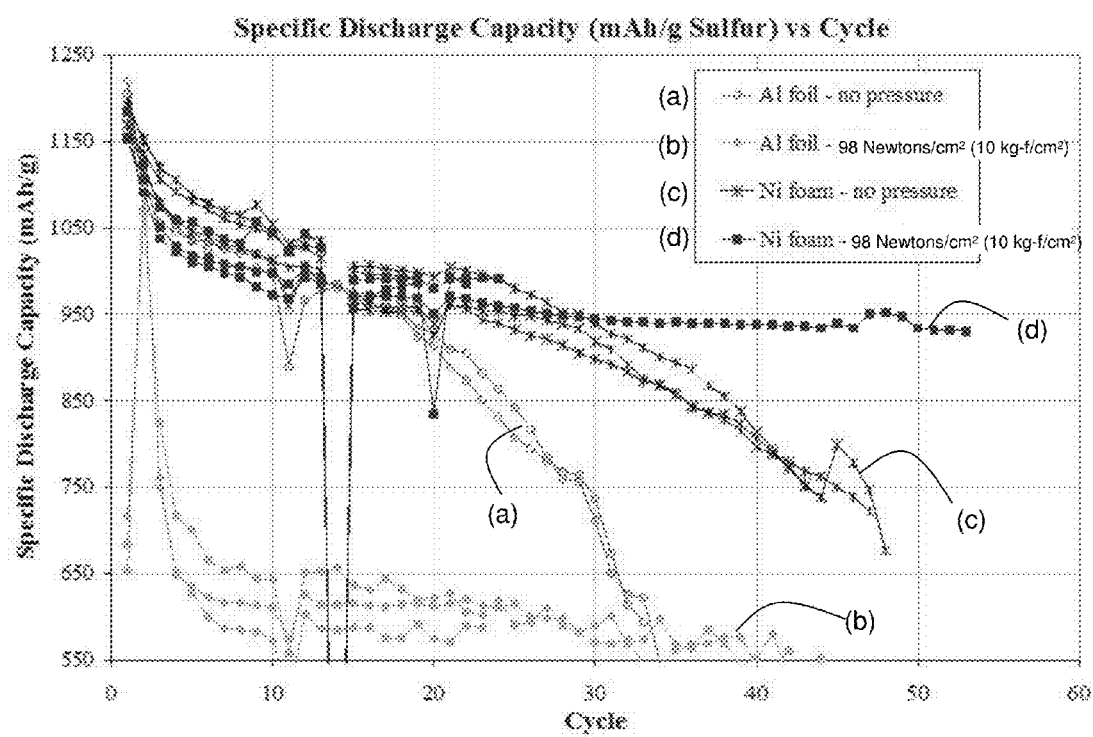
FIG. 10 includes a plot of specific discharge capacity as a function of the number of charge-discharge cycles for exemplary electrochemical cells.

The above components were assembled into a layered structure of cathode/separator/anode, which was folded in half to make a bicell. The bicell was placed in a foil pouch with approximately 0.4 grams of a liquid electrolyte. After storing for 24 hours, half of the cells were tested without compression, and the other half were compressed between two parallel plates at a pressure of 98 Newtons/cm$^2$ (about 10 kg-force/cm$^2$). The liquid electrolyte filled the void areas of the separator and cathode to form prismatic cells with an electrode area of about 33 cm$^2$. Discharge-charge cycling was performed at 13.7 mA and 7.8 mA, respectively. The discharge cutoff voltage was 1.7V and the charge cutoff voltage was 2.5V. FIG. 10 includes a plot of specific discharge capacity as a function of the number of charge-discharge cycles for electrochemical cells comprising the cathodes fabricated in this example. The nickel foam electrodes continued to exhibit relatively high discharge capacities, even after 40 charge-discharge cycles. The application of 98 Newtons/cm$^2$ (about 10 kg-force/cm$^3$) of pressure to the cells led to more consistent cycling performance after about 30 cycles. The use of nickel foam and the application of pressure led to reduced fade rates and extended cycle life. In addition, the rate of polarization increase was much slower for the nickel foam cells, especially when pressure was applied.

COMPARATIVE EXAMPLE 3

In this example, a cathode was prepared by coating a mixture of 75 parts of elemental sulfur, 20 parts of Printex® XE-2, 4 parts graphite powder, and 1 part of polyvinyl alcohol dissolved in a 1:1 weight ratio mixture of isopropanol and water onto a 7-micron thick, conductive carbon coated aluminum foil substrate. After drying, the coated cathode active layer thickness was about 90 microns. Cells were assembled and tested as outlined in Example 3. Cycling results are summarized in FIG. 10. The cell comprising the cathode deposited on the aluminum foil substrate exhibited relatively lower specific discharge capacity relative to the cell comprising the nickel foam cathode.

EXAMPLE 4

This example describes the fabrication and testing of electrochemical cells comprising sintered nickel cathodes. Cells with sintered nickel cathodes were prepared using Inco filamentary nickel powder type 255 (Inco Special Products). The nickel particles had an apparent density of 0.5 to 0.65 g/cm$^3$. In addition, the particles had diameters of between about 1 micron and about 100 microns, with a median diameter of around 20 microns. The nickel powder was suspended in acetone, a relatively volatile liquid, by vigorously mixing the powder and the suspension fluid to produce a slurry. The slurry was poured into a crucible, and the slurry was smoothened to distribute the nickel powder evenly and flatly across the bottom surface of the crucible. The volatile suspension fluid was then allowed to evaporate at room temperature, leaving behind a relatively ordered array of nickel particles.

At this point the nickel powder was ready for sintering. The sintering process was conducted in a reducing atmosphere comprising 95% nitrogen and 5% hydrogen. The nickel powder was sintered by ramping the temperature to 800° C. at a rate of 5° C./min, holding for 10 minutes, and allowing the samples to furnace cool with the heating elements turned off. The final sintered structure had a thickness of about 250 microns, with a pore size distribution centered at about 15 microns.

Sulfur was then added to the sintered nickel porous support structure. To incorporate the sulfur, an oil bath was prepared and heated to 85° C. A beaker containing toluene saturated with sulfur was placed in the bath and allowed to come to equilibrium. To ensure a saturated solution a small amount of sulfur was maintained in solid form as a second phase in the beaker, by adding sulfur to the toluene as necessary. Toluene was added to the beaker as necessary to maintain nearly the same volume of toluene in the beaker at all times. Each time a significant addition of reagent (sulfur or toluene) was added, the system was allowed to come to equilibrium. The nickel electrodes were dipped into the beaker with sulfur saturated toluene, and dried with an argon stream. Once all the electrodes in a batch were dipped, they were baked in a vacuum oven at 80° for several hours (anywhere from 1 to overnight ~14, with 3-4 being the most common, appeared to have no effect as long as toluene smell was not present when the oven was opened). The electrodes were weighed and compared with pre-dipping weight to determine the amount of sulfur present. If the amount of sulfur was below the desired amount the dipping was repeated. If the amount of sulfur was above the desired amount the electrodes were quickly dipped in pure toluene, then baked according to the previous procedure. All the electrodes were loaded with between 1.5 and 2 mg $S_8$/cm$^2$. The porosity of the final structure was substantially the same as the nickel once the sulfur was dissolved.

An electrochemical cell including the cathode was assembled for testing. The anode included a vapor deposited lithium film 26 microns in thickness. The electrolyte included 8 parts of lithium bis(trifluoromethane sulfonyl)imide and 4 parts lithium nitrate in a 1:1 weight ratio mixture of 1,3-dioxolane and dimethoxyethane. The electrolyte included a water content of less than 50 ppm. A 16-micron SETELA porous separator was also used. The above components were assembled into a layered structure of single sided anode/separator/2×(2 sided cathode/separator/2×anode back to back/separator)/2 sided cathode/separator/single sided anode. This flat cell was placed in a foil pouch with approximately 0.62 grams of a liquid electrolyte. After storing for 24 hours the cells were compressed between two parallel plates at a pressure of 98 Newtons/cm$^2$ (about 10 kg-force/cm$^2$). The liquid electrolyte filled the void areas of the separator and cathode to form flat cells with an electrode area of about 99.441 cm$^2$. Discharge-charge cycling was performed at 40 mA and 25 mA, respectively. The discharge cutoff voltage was 1.7V and the charge cutoff voltage was 2.5V FIG. 11 includes a plot of the percentage capacity of the tested cells as a function of C-rate. The cells cycled normally until the 15$^{th}$ discharge when standard rate testing was completed.

Figure 11:
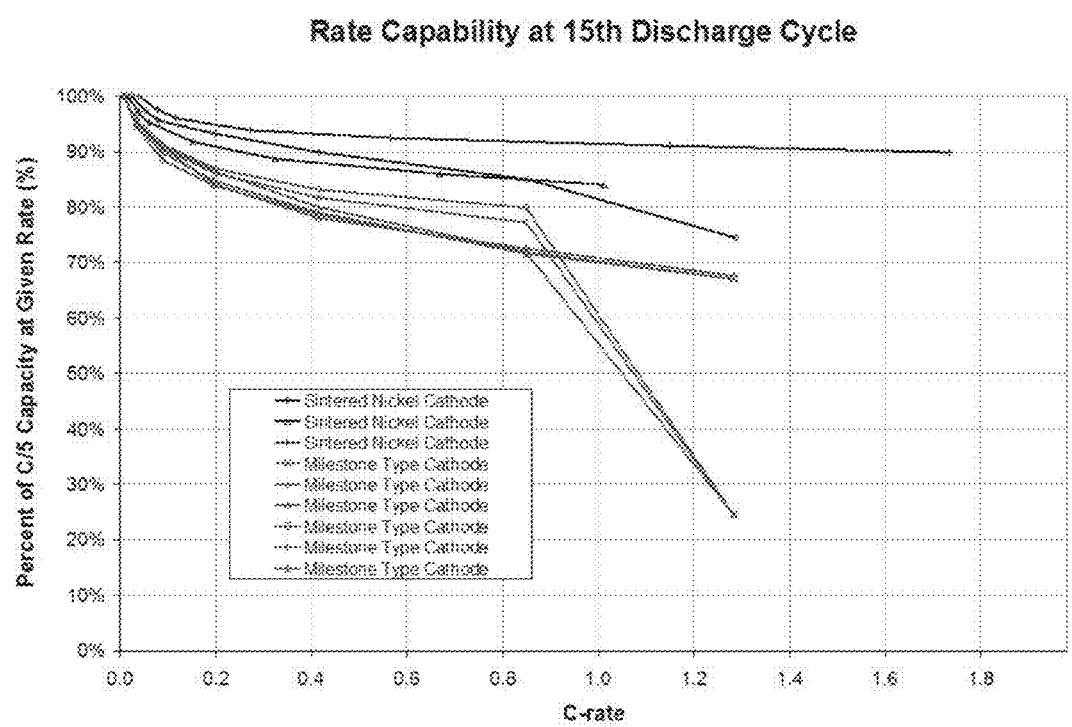
FIG. 11 includes an exemplary plot of percentage capacity as a function of C-rate, according to one set of embodiments.

Electrochemical cells were fabricated using milestone cathodes for comparison purposes. The milestone cathodes were made essentially as described in Comparative Example 1, except in this case, the cathodes included a 55/20/20/4 mixture of sulfur/XE-2/Vulcan XC72R/PVOH. As can be seen in FIG. 11, the cells including the sintered nickel cathodes exhibited a higher percentage capacity at higher rates relative to the cells with milestone cathodes.

EXAMPLE 5

This example describes the fabrication and testing of electrochemical cells comprising cathodes fabricated using a polymeric porous support structure. The polymeric porous support structure was produced by combining a solution of polyvinyl alcohol (PVA) with ammonium bicarbonate as a blowing agent, Vulcan carbon, TIMCAL Ks6 graphite, and carbon fibers were added to the solution of PVA to increase the electrical conductivity and act as reinforcing agents to improve the mechanical properties of the PVA matrix.

The ammonium bicarbonate was pre-milled in an attritor mill to reduce the particle size to the 1 to 2 micron range. Isopropyl alcohol (IPA) was used as a carrier solvent during this milling and was vacuum filtered from the milled ammonium bicarbonate. To remove the final amounts of IPA, the ammonium bicarbonate was allowed to dry in an open pan over night. During this overnight drying about 20% of the ammonium bicarbonate was lost to sublimation.

To prepare the final slurry, a solution containing Vulcan XC72R Carbon and Timcal KS6 graphite (6 micron diameter platelets) was milled with a soluble binder solution of PVOH in water, IPA and 2-(2-ethoxyethoxyl)ethanol (i.e., dowanol; Dow Chemical) solvents. This milled solution is designated as VKC2.

In a second milling step, the VKC2 solution was milled for 20 minutes in a attritor mill with Polygraff PR-24 carbon fibers (Pyrograf Products, Inc., 8 micron diameter, 100-150 micron length) and a small amount of additional water. Water was added to improve the adhesion of the foamed primer to the aluminum substrate (the same type of aluminum foil substrate described in Example 1). The pre-milled ammonium bicarbonate was then added at a ratio of 8 parts ammonium bicarbonate to one part, by weight, of the original primer solids. This final mixture was then milled for 10 minutes before being discharged from the attritor mill.

To further reduce the final pore sizes formed by the ammonium bicarbonate, the VKC2/fiber/ammonium bicarbonate mixture was passed thru a Micro-fluidizer. A single 400 micron chamber was used, and the discharge pressure was set to 5 kpsi.

One the same day that it was prepared, the slurry was coated onto an aluminum substrate using a slot die. The coating was dried in a four zone, air convection oven (MEGTEC Systems, DePere, Wis.). The temperatures of each zone were controlled between 25° C. and about 85° C. to allow of the formation of the pores in the final cathode structure and control the brittleness/adhesion of the cast slurry.

The thickness of the dried, porous polymer matrix prior to compression was about 216.7 microns. Upon applying a force of about 98 Newtons/cm$^2$ (about 10 kg$_f$/cm$^2$), the polymer matrix thickness was about 112.1 microns. The weight of the polymer matrix was about 1.064 mg/cm$^2$. The dibutyl phthalate (DBP) available void space was measured by placing a weighed sample in a bag with an excess amount of DBP to saturate the sample, and re-weighing the resulting saturated sample. The DFP available void space was about 0.0038 cm$^3$/cm$^2$ per side, which was significantly larger than the 0.0015 cm$^3$/cm$^2$ required for 1.85 mg S$_8$/cm$^2$.

BET surface area measurements of the polymer matrix indicated that the available surface area was about 39 m$^2$/g.

Figure 12:
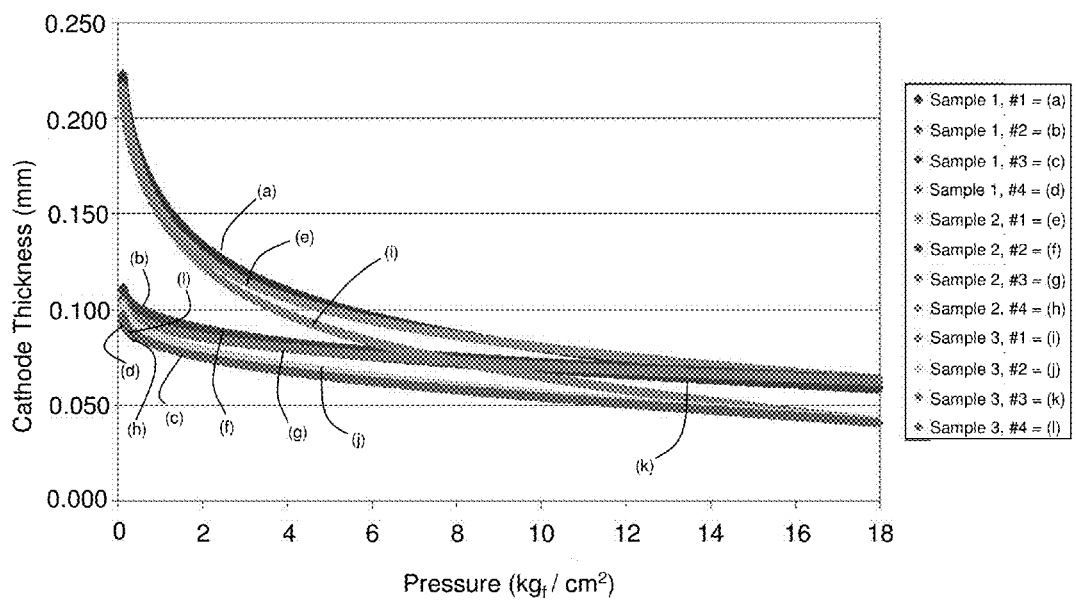
FIG. 12 includes, according to one set of embodiments, a plot of cathode thickness as a function of applied pressure.

FIG. 12 includes a plot of the polymer matrix thickness as a function of the applied pressure (in kg$_f$/cm$^2$, which can be converted to Newtons/cm$^2$ by multiplying by about 9.8). Three samples were tested. The applied force was increased from 0 to 20 kg$_f$/cm$^2$, for a total of four cycles per sample (labeled #1, #2, #3, and #4 in FIG. 12). As the force was applied, the thickness of the sample was measured. After the initial cycle, the thickness of each sample returned to only about 45% of its original thickness. As the samples were exposed to the forces, the DBP uptake of the foam did not vary significantly before and after initial compression. The data reported in this example was taken after initial compression.

Figure 13:
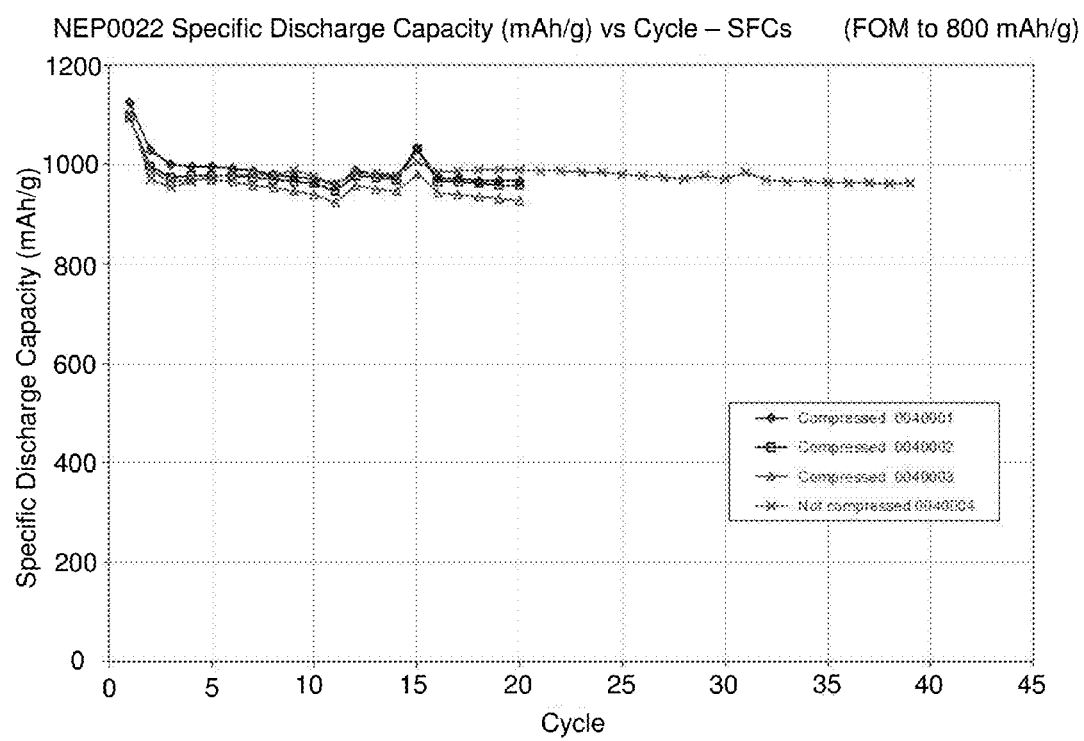
FIG. 13 includes an exemplary plot of specific discharge capacity as a function of cycle number, according to some embodiments.

After formation of the conductive polymer matrix, sulfur was added by dipping the polymer matrix into a hot bath of toluene saturated with sulfur. An electrochemical cell including the cathode was assembled for testing. Lithium metal (>99.9% Li, 2 mil thick foil from Chemetall-Foote Corp., Kings Mountain, N.C.) was used for the anode. The electrolyte included 8 parts of lithium bis(trifluoromethane sulfonyl) imide, (lithium imide available from 3M Corporation, St. Paul, Minn.), 3.8 parts lithium nitrate (available from Aldrich Chemical Company, Milwaukee, Wis.), 1 part guanidine nitrate (also available from Aldrich Chemical Company, Milwaukee, Wis.) and 0.4 parts pyridine nitrate (synthesized in-house from pyridine and nitric acid) in a 1:1 weight ratio mixture of 1,3-dioxolane and dimethoxyethane. The electrolyte included a water content of less than 50 ppm. A porous separator comprising 9-µm SETELA (a polyolefin separator available from Tonen Chemical Corporation, Tokyo, Japan, and from Mobil Chemical Company, Films Division, Pittsford, N.Y.) was included between the anode and the cathode. The dual sided cathode was wrapped with the separator and anode foil and then placed in a foil pouch. 0.42 grams of the liquid electrolyte are then added to the foil pouch. The liquid electrolyte fills the void areas of the separator and cathode to form prismatic cells with an electrode area of about 31.8 cm$^2$. After sealing, the cells were stored for 24 hours. Prior to being placed on test the cells are compressed between two parallel plates at a pressure of 98 Newtons/cm$^2$ (about 10 kg$_f$/cm$^2$). Charge-discharge cycling was performed at 13.7 mA and 7.8 mA, respectively. The discharge cutoff voltage was 1.7V and the charge cutoff voltage was 2.5V. The electrochemical cells were exposed to a compressive force of 10 kg$_f$/cm$^2$ (about 98 Newtons/cm$^2$). FIG. 13 includes a plot of the specific discharge capacity of the cells as a function of the charge/discharge cycle. The cells exhibited comparable performance through 20 cycles.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode for use in an electrochemical cell, comprising:
    a porous support structure comprising a plurality of pores; and
    an electrode active material comprising sulfur substantially contained within the pores of the porous support structure, wherein:
        each pore of the plurality of pores has a pore volume, and the plurality of pores has a total pore volume defined by the sum of each of the individual pore volumes;
        at least about 50% of the total pore volume is occupied by pores having cross-sectional diameters of between about 0.1 microns and about 10 microns, and
        the electrode comprises at least about 20 wt % sulfur.

2. An electrode for use in an electrochemical cell, comprising:
    a porous support structure comprising a plurality of pores; and
    an electrode active material comprising sulfur substantially contained within the pores of the porous support structure, wherein:
        the plurality of pores of the porous support structure together defines a total pore volume, and at least about 50% of the total pore volume is defined by pores having cross-sectional diameters of between about 0.1 microns and about 10 microns; and
        the electrode comprises at least about 20 wt % sulfur.

3. An electrode as in claim 1, wherein the porous support structure comprises an electrically conductive material.

4. An electrode as in claim 1, wherein the porous support structure comprises at least one of carbon, a metal, a polymer, a ceramic, and a semiconductor.

5. An electrode as in claim 1, wherein the porous support structure comprises carbon.

6. An electrode as in claim 1, wherein the porous support structure comprises silicon dioxide.

7. An electrode as in claim 1, wherein the sulfur comprises at least one of elemental sulfur, polymeric sulfur, inorganic sulfides, inorganic polysulfides, organic sulfides, organic polysulfides, and sulfur organic compounds.

8. An electrode as in claim 1, wherein the sulfur comprises elemental sulfur.

9. An electrode as in claim 1, wherein the electrode contains less than about 20 wt % binder.

10. A method of making an electrode for use in an electrochemical cell, comprising:
    providing a porous support structure comprising a plurality of pores, wherein the plurality of pores of the porous support structure together define a total pore volume, and at least about 50% of the total pore volume is defined by pores having cross-sectional diameters of between about 0.1 microns and about 10 microns; and
    depositing an electrode active material comprising sulfur within the pores of the porous support structure,
    wherein the electrode comprises at least about 20 wt % sulfur.

11. An electrode as in claim 2, wherein the porous support structure comprises an electrically conductive material.

12. An electrode as in claim 2, wherein the porous support structure comprises carbon.

13. An electrode as in claim 2, wherein the sulfur comprises elemental sulfur.

14. An electrode as in claim 2, wherein the electrode contains less than about 20 wt % binder.

15. A method as in claim 10, wherein the porous support structure comprises carbon.

16. A method as in claim 10, wherein the sulfur comprises elemental sulfur.

17. A method as in claim 10, wherein the electrode contains less than about 20 wt % binder.

* * * * *